June 27, 1967 W. C. HUGHES ETAL 3,328,776

THERMOPLASTIC FILM TAPE RECORDER

Original Filed Aug. 21, 1959

9 Sheets-Sheet 1

Inventors
William C. Hughes
John E. Wolfe by Charles W. Helzer
Their Attorney

THERMOPLASTIC FILM TAPE RECORDER

Original Filed Aug. 21, 1959 9 Sheets-Sheet 2

Inventors
William C. Hughes
John E. Wolfe
by Charles W. Helzer
Their Attorney

Inventors
William C. Hughes
John E. Wolfe
by Charles W. Helzer
Their Attorney

THERMOPLASTIC FILM TAPE RECORDER

Original Filed Aug. 21, 1959

Inventors
William C. Hughes
John E. Wolfe by Charles W. Helzer
Their Attorney

THERMOPLASTIC FILM TAPE RECORDER

Original Filed Aug. 21, 1959 9 Sheets-Sheet 5

Inventors
William C. Hughes
John E. Wolfe
by Charles W. Helzer
Their Attorney

THERMOPLASTIC FILM TAPE RECORDER

Original Filed Aug. 21, 1959 9 Sheets-Sheet 6

Inventors
William C. Hughes
John E. Wolfe
by Charles W. Helzer
Their Attorney

THERMOPLASTIC FILM TAPE RECORDER

Inventors
William C. Hughes
John E. Wolfe
by Charles W Helzer
Their Attorney

Inventors
William C. Hughes
John E. Wolfe
by Charles W. Helzer
Their Attorney

THERMOPLASTIC FILM TAPE RECORDER

Original Filed Aug. 21, 1959

Inventors
William C. Hughes
John E. Wolfe by Charles W. Helzer
Their Attorney 3,328,776
THERMOPLASTIC FILM TAPE RECORDER William C. Hughes, Scotia, and John E. Wolfe, Ithaca, N.Y., assignors to General Electric Company, a corporation of New York Original application Aug. 21, 1959, Ser. No. 835,210. Divided and this application Nov. 23, 1964, Ser. No. 413,031
17 Claims. (Cl. 340—173)

The present invention relates to tape recorders, and is a division of abandoned copending application Ser. No. 835,210, filed Aug. 21, 1959, entitled Thermoplastic Film Tape Recorder, W. C. Hughes, John E. Wolfe, and R. J. Rieke, inventors, assigned to the General Electric Company.

More particularly, the invention relates to tape recorders which employ an impressionable thermoplastic tape upon which data can be recorded by electron writing, and from which data previously stored may be read out by electro-optical means.

The volume and complexity of data handling equipment for use by both industry and the military, have become so great in recent years that considerable effort is being expended to develop better recorders for use with such equipment. Because of the large volume of data to be handled by such equipment, and because the data to be recorded is in both analog and digital form, it is necessary that the recorders be readily adapted to both digital and analog recording, and that the recorder have a relatively large capacity to store information which in turn requires large packing densities in the data recorded. It is also necessary that the recorder make a good quality reproduction of the data recorded, and it must provide the data within reasonable access time periods.

It is therefore, a primary object of the present invention to provide new and improved tape data recorders upon which data can be recorded by electron writing, and from which previously recorded data can be read out by electro-optical means; and which can be readily adapted to both digital and analog recording.

Another object of the invention is to provide tape data recorders of the above type which have high packing densities in comparison to currently known recorders, and hence, have a large recording capacity in contrast to their size.

Still another object of the invention is to provide new and improved tape data recorders having the above set forth characteristics wherein the quality of reproduction of the recorded data is excellent, and which are capable of being operated over broad frequency ranges.

A still further object of the invention is to provide a new and improved random access tape data recorder of the above type which has relatively fast access time in comparison to the volume of data which it stores.

In practicing the invention tape data recorders are provided which include in combination a tape of solid impressionable thermoplastic film recording medium, and an electron writing apparatus for impressing electrons on the tape in desired intelligence conveying patterns. Tape drive means are also provided for moving the tape at least in the direction of its longitudinal axis, and for accurately positioning any desired point along the tape with respect to the electron writing apparatus. Preferred embodiments of the recorder also include a heating means for conditioning the impressionable plastic tape to accept the electron patterns, and for curing the tape after impression of the electron patterns thereon to permanently set the patterns thereby to form light modifying marks or gratings on the tape. The tape recorders are completed by a readout means for inspecting portions of the impresisonable tape having light modifying marks formed thereon in intelligence conveying patterns, and for deriving an output electrical signal indicative of such intelligence. In one embodiment of the invention, data is recorded on a thermoplastic film tape in a continuous track extending along the longitudinal axis of the tape. A random access tape recorder also is provided wherein the data is stored in small blocks arranged in lines extending across the width of the tape, and which includes an addressing mechanism for addressing either the writing apparatus or the readout means of the recorder randomly to a desired block of data, or to the position where it is desired to record a block of data.

Other objects, features and many of the attendant advantages of this invention will be appreciated more readily as the same becomes better understood by reference to the following detailed description, when considered in connection with the accompanying drawings wherein like parts in each of the several figures are identified by the same reference character and wherein.

Figure 1:
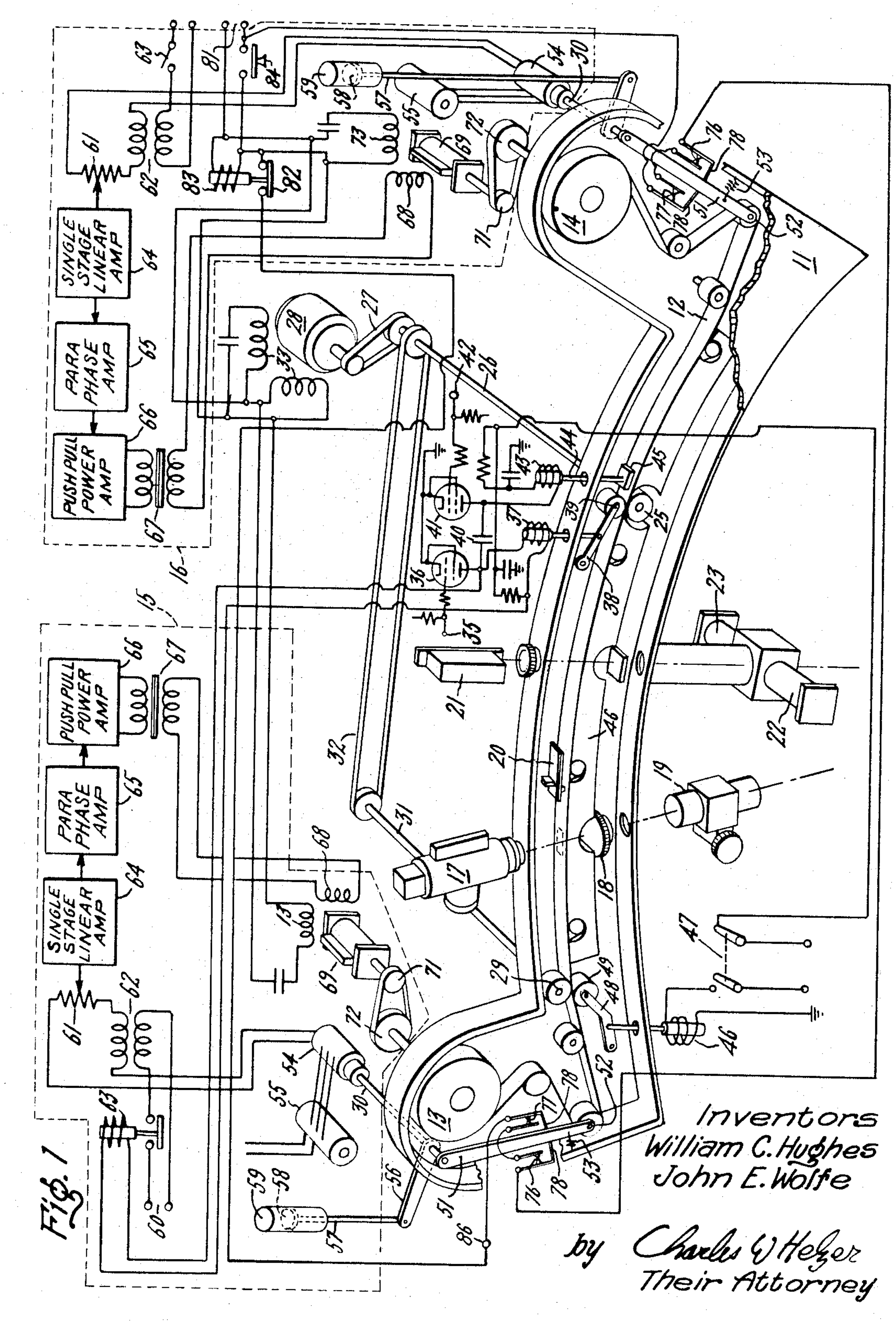
FIGURE 1 is a partially broken away perspective view of one form of a thermoplastic film tape data recorder constructed in accordance with the invention.
Figures 2, 2A, 3:
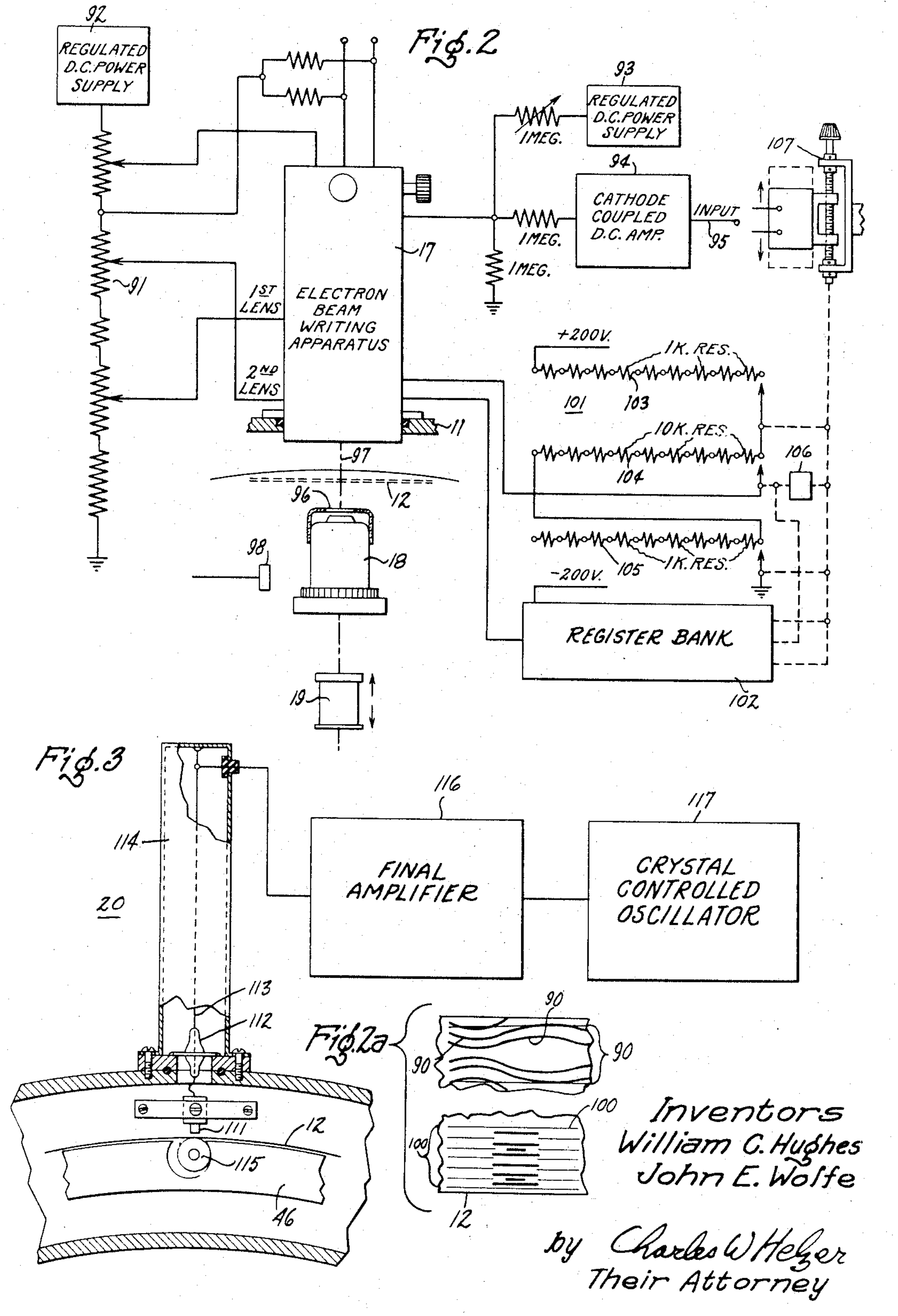
FIGURE 2 is a partial schematic circuit wiring diagram of the energization circuits for the electron beam writing apparatus comprising part of the tape data recorder shown in FIGURE 1.
Figures 4, 5, 6:
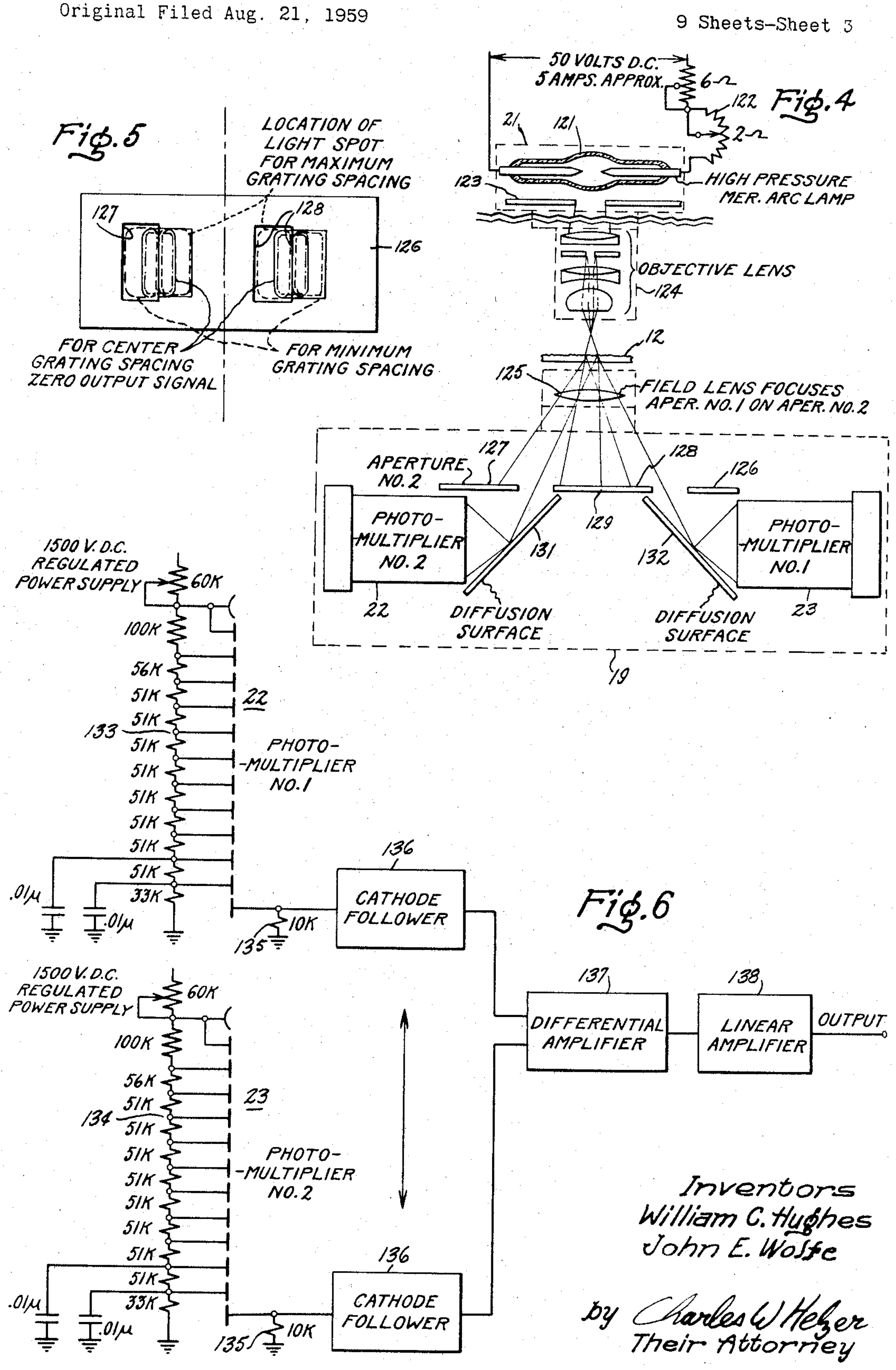
Figures 7, 8:
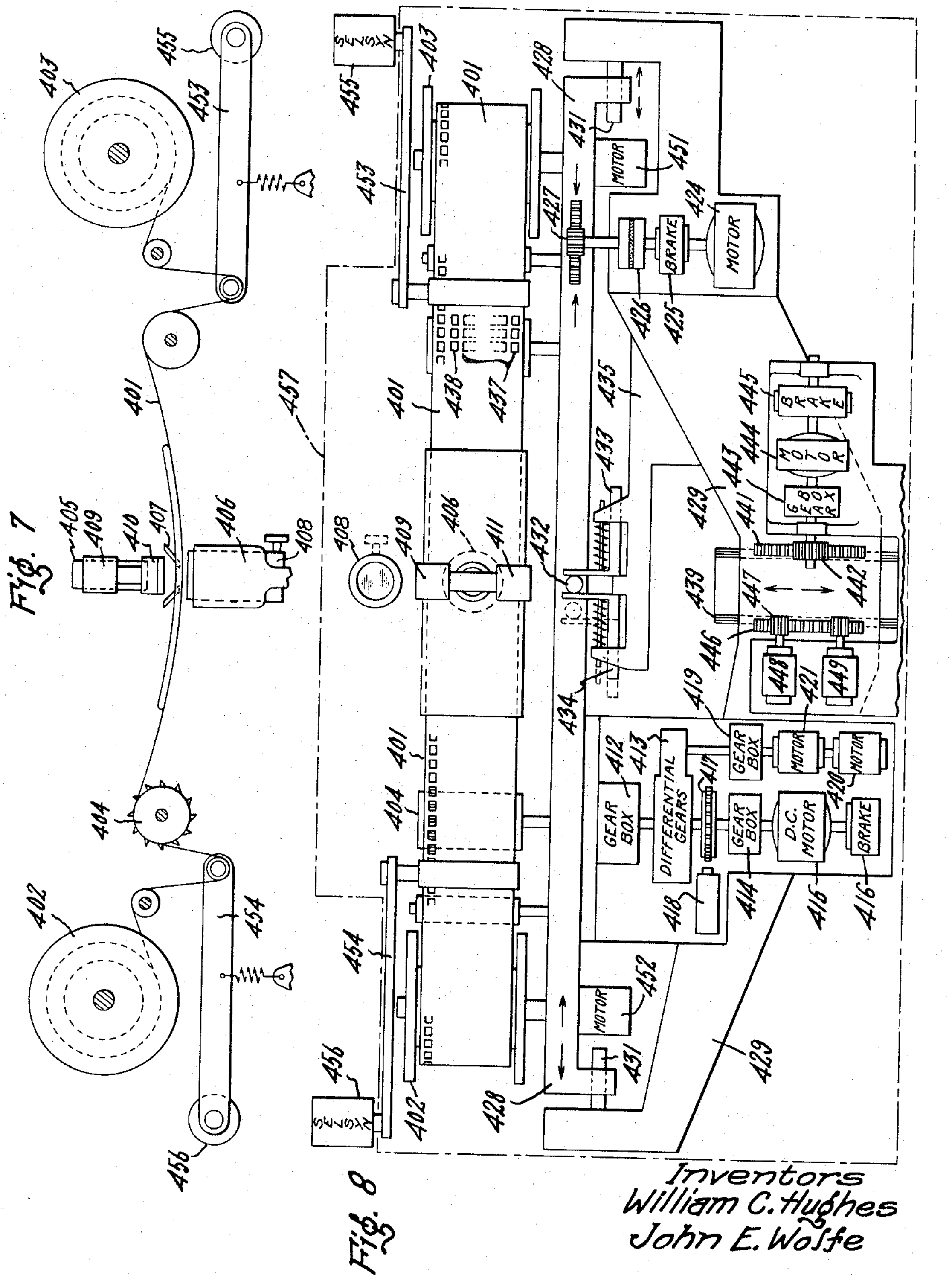
Figure 9:
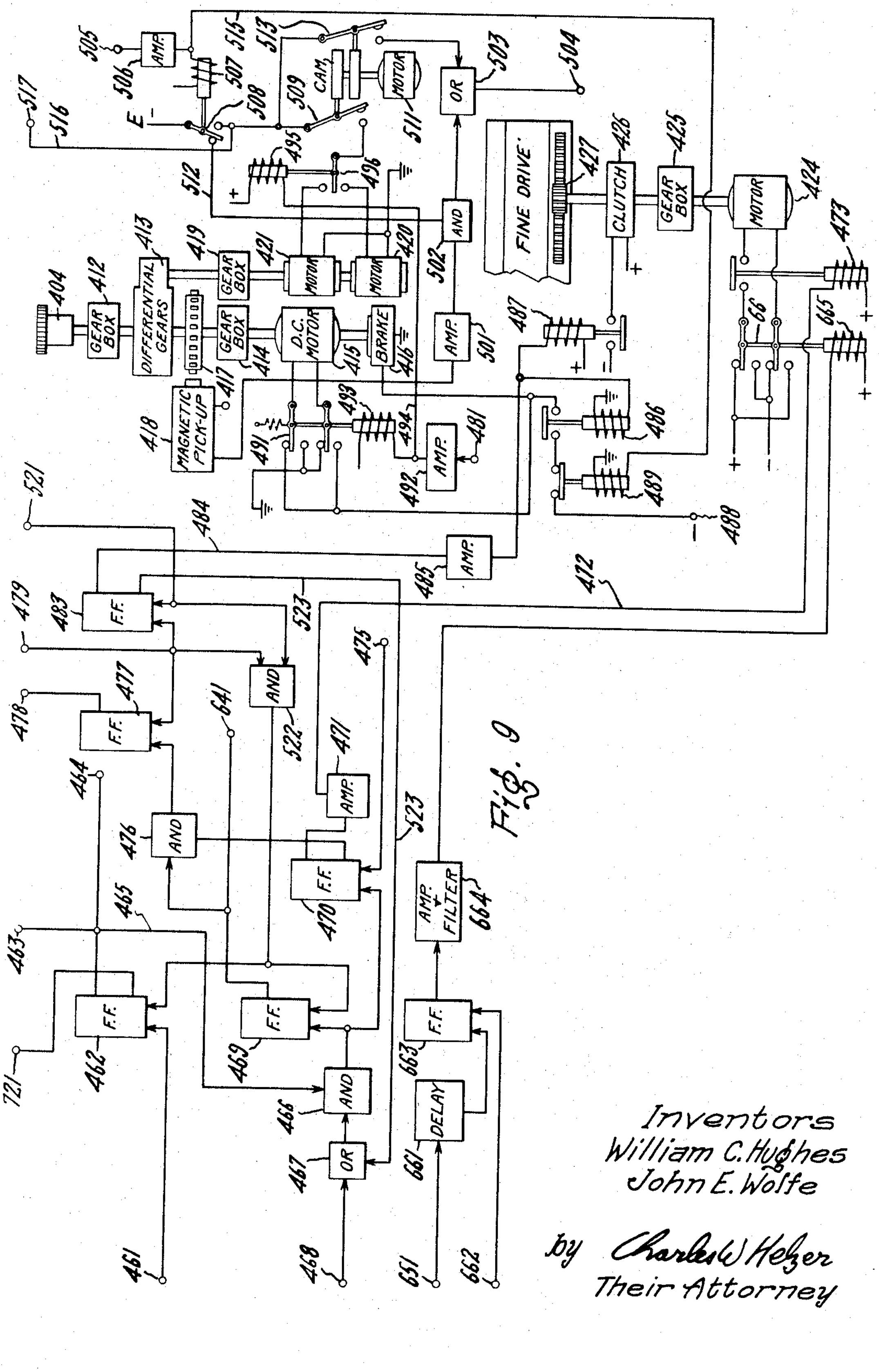
Figure 10:
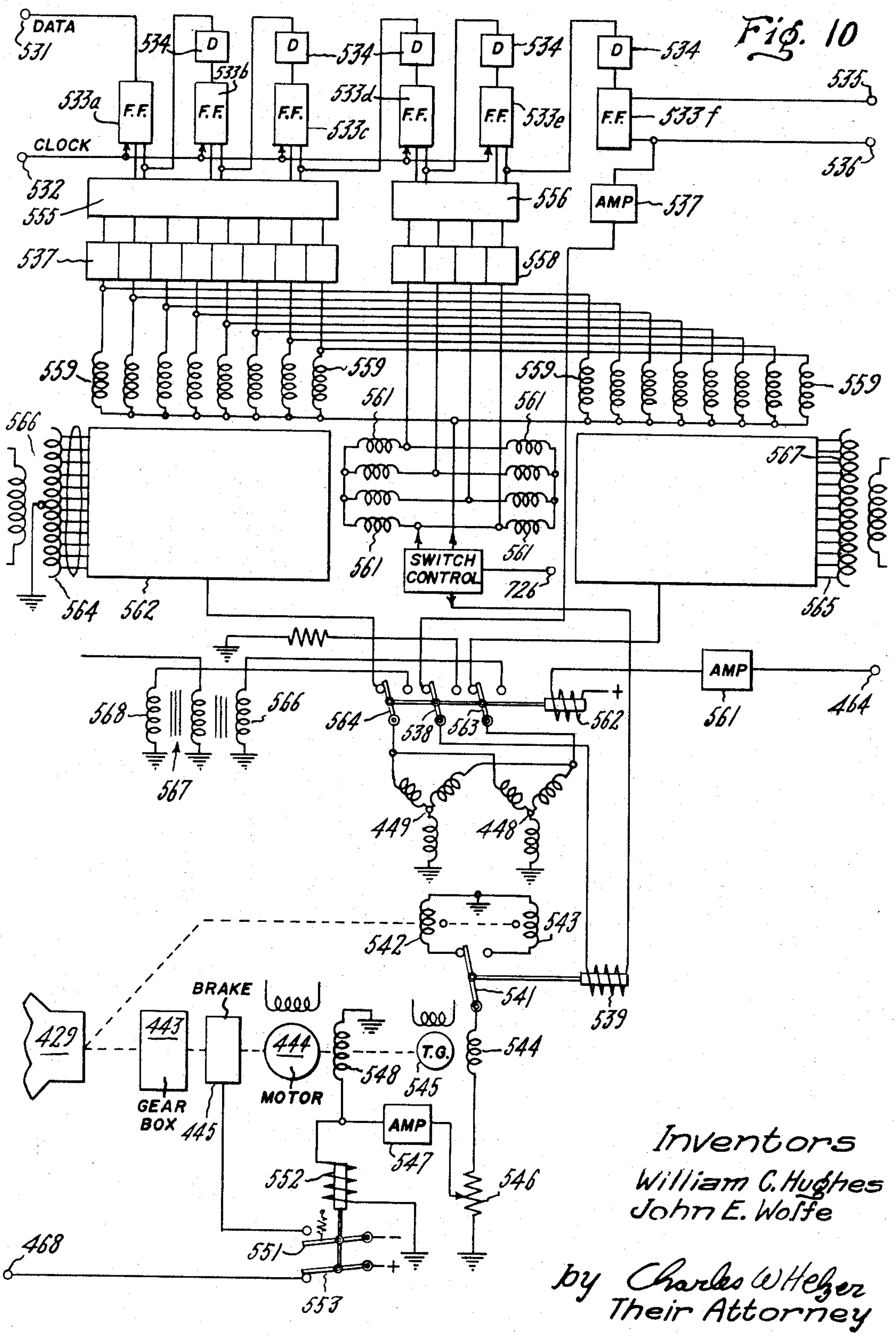
Figure 11:
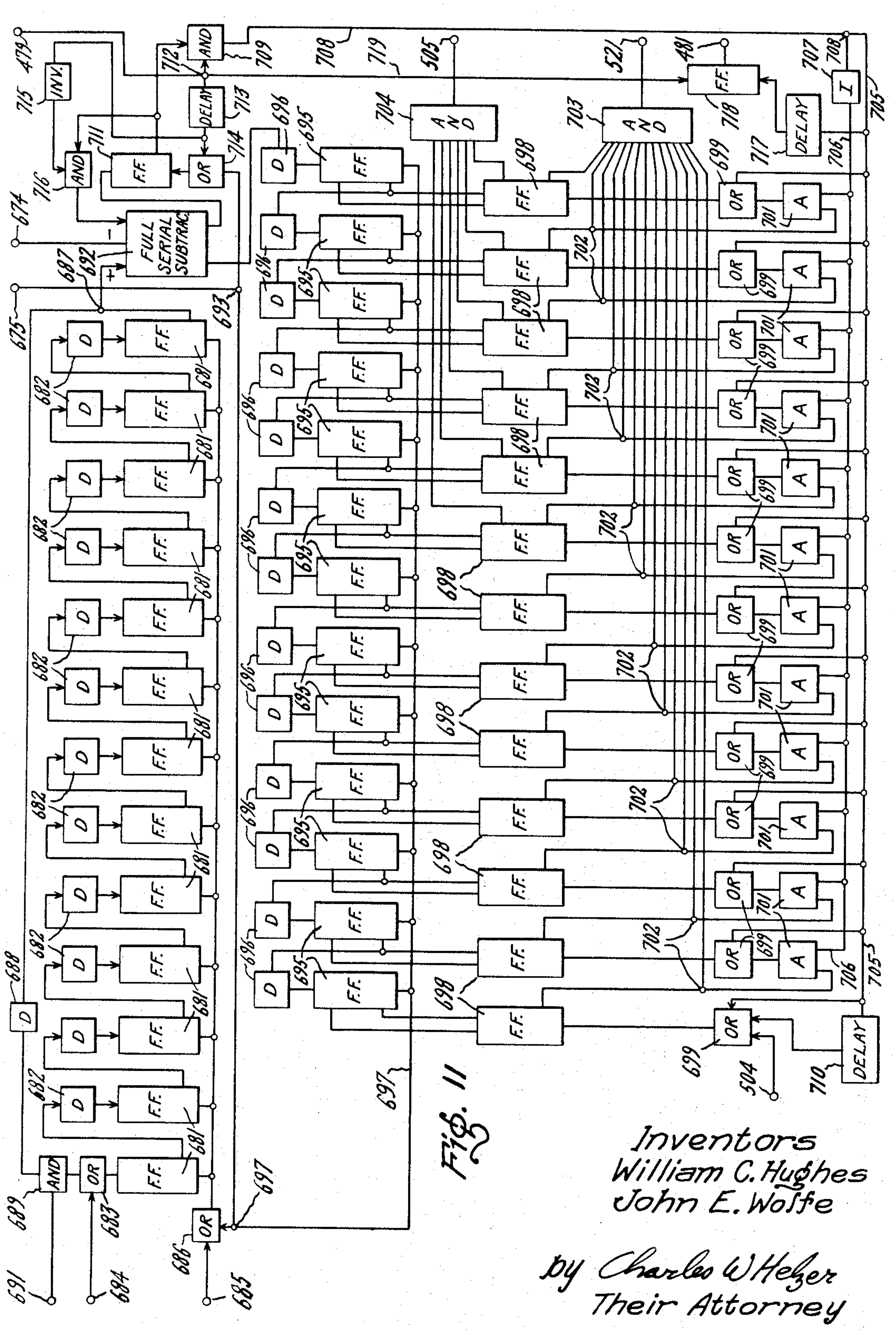

FIGURE 2*a* is a plan view of a part of the thermoplastic film tape showing the manner in which data is recorded in tracks on the tape by the electron beam writing apparatus shown in FIGURE 2;

FIGURE 3 is a cross-sectional view of a part of the housing of the tape data recorder shown in FIGURE 1, and illustrates the construction of the heating means comprising a part of the recorder;

FIGURE 4 is a functional block diagram of the physical arrangements of the part of the readout means comprising a part of the tape data recorder in FIGURE 1;

FIGURE 5 is a plan view of an apertured plate comprising a part of the readout assembly of FIGURE 4;

FIGURE 6 is a functional block diagram of the electrical circuitry connected to the photomultipliers comprising a part of the readout system of FIGURE 4;

FIGURE 7 is a side view of a random access tape recorder constructed in accordance with the present invention;

FIGURE 8 is a plan view of the mechanical arrangement of the transport mechanism for the random access tape recorder shown in FIGURE 7;

FIGURE 9 is a functional block diagram of the horizontal drive circuits comprising a part of the random access tape recorder shown in FIGURE 7;

FIGURE 10 is a functional block diagram of a vertical drive circuit comprising a part of the random access tape recorder shown in FIGURE 7;

FIGURE 11 is a functional block diagram of an address comparison circuit for comparing and deriving a difference address to be used in controlling the operation of the horizontal drive circuit of FIGURE 19, and the vertical drive circuit of FIGURE 10.

Figures 12, 12A:
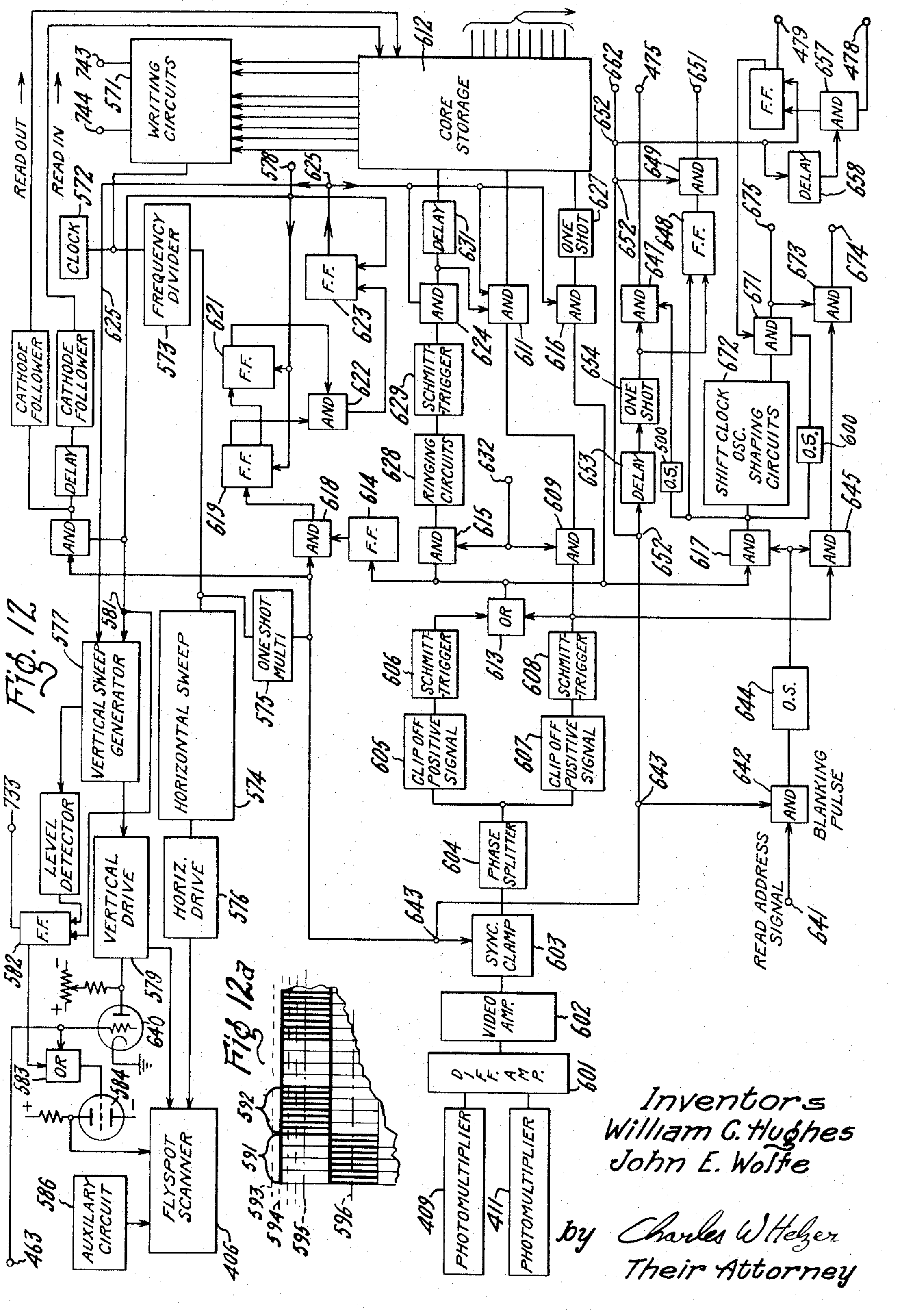
Figure 13:
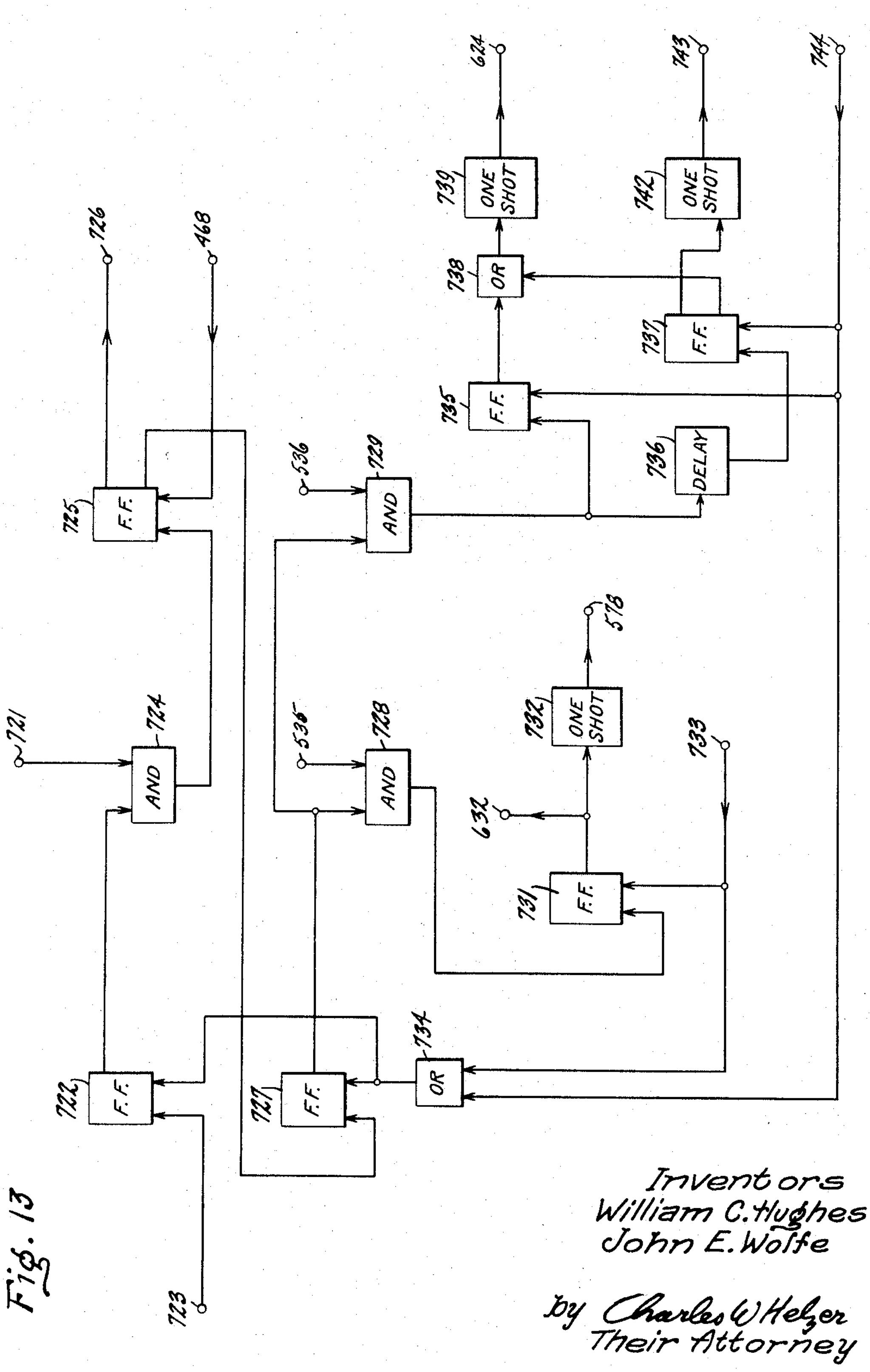

FIGURE 12 is a functional block diagram of a reading system to be used in reading out data from the random access data recorder shown in FIGURE 7;

FIGURE 12*a* is a plan view of a thermoplastic film tape showing the manner in which data is recorded thereon by the random access tape data recorder of FIGURE 7; and FIGURE 13 is a functional block diagram of a controller unit used in the random access tape data recorder of FIGURE 7.

A broken away perspective view of a thermoplastic film tape recorder constructed in accordance with the invention is illustrated in FIGURE 1 of the drawings. The tape recorder shown in FIGURE 1 includes an outer housing 11 fabricated from aluminum or other suitable light-weight metal. Supported within the housing 11 is a long thin, wide in comparison to its thinness tape 12, having a thermoplastic film surface. The tape 12 actually comprises a thin wide tape of Mylar or Cronar having a transparent conductive surface formed thereover, and a thermoplastic film surface covering the transparent conductive surface. One manner in which the tape 12 can be fabricated is disclosed more fully in U.S. Patent Number 3,113,179, issued Dec. 3, 1963, and assigned to the General Electric Company. The tape 12 is movably supported on a pair of reels 13 and 14 rotatably mounted on opposite ends of housing 11. To help in the explanation of the construction and operation of the tape recorder, it shall be assumed that the reel 14 shall be the forward take-up reel, and that the reel 13 shall be the reverse take-up reel. In order to drive the reverse reel 13, a servo mechanism indicated in the dotted outline box 15 is connected to the reel, and in order to drive the forward reel 14, a similar drive servo mechanism 16 is connected to the reel 14. The manner in which these mechanisms coact to drive the tape 12 forward or reverse direction to position any desired point along the tape at its particular location, will be explained more fully hereinafter.

In using the tape recorder, the tape 12 is first caused to move past an electron beam writing apparatus 17 which directs a fine writing electron beam through a suitable vacuum tight window in housing 11 down upon the tape in order to write intelligence patterns thereon in a manner to be described more fully hereinafter. To facilitate in aligning and focusing the electron beam produced by the electron beam writing apparatus 17 a viewing arrangement is provided which is formed by fluorescent screen and objective lens assembly 18, and an eyepiece viewing assembly 19 designed to give the operator a visual presentation of the wiring electron beam size. After writing desired intelligence patterns on the thermoplastic film tape 12, the tape may be positioned below a readout means formed by a light source 21 mounted over a window in the housing 11 for projecting a beam of light down on the intelligence patterns formed in the thermoplastic film tape 12. This beam of light is then diffracted by the intelligence patterns in the thermoplastic film tape 12 so that the diffracted light passes through a field lens assembly and selective aperture plate where it is directed against either one of two photomultiplier tubes 22 and 23. Prior to moving the intelligence pattern under the readout assembly formed by light source 21 and photomultiplier tubes 22 and 23, the tape 12 is passed under a heating assembly 20. The heating electrode 20 is designed to heat the surface of the thermoplastic film tape 12 after electron beam patterns have been formed therein to cause the electron patterns to form permanent depressions in the tape which thereafter can act as diffraction patterns in the aforementioned manner as described with relation to the readout assembly formed by the light source 21 and the photomultiplier tubes 22 and 23.

The tape 12 is moved past the electron beam writing apparatus 17, the heating device 20, and the readout means 21–23 in the forward direction by a positive drive wheel 25 which is keyed to a shaft 26 driven by a pulley belt arrangement 27 and electric motor 28. Thermoplastic film tape 12 is moved in the reverse direction by a reverse drive wheel 29 keyed to a shaft 31 which in turn is driven by a pulley belt 32 having a drive wheel keyed to the shaft 26. By this arrangement, the direction of rotation of the two drive wheels 25 and 29 are the same, and are continuously rotated. The drive wheels 25 and 29 are started by means of a motor starting arrangement including a selector switch 84 which connects a 60 cycle alternating current supply across the windings of relay 83 which picks up and locks in through contact 82 and tape tension limit contacts 76 and 77, the action of which will be explained more fully hereinafter. Windings 33 of motor 28 are connected in parallel with relay 83 and are thereby energized at the same time as relay 33. By closing the switch 84, the motor 28 is caused to be rotated thereby causing the drive wheels 25 and 29 to be rotated continuously at approximately the same speed.

In order to cause the forward drive wheel 25 to positively drive the thermoplastic film tape 12 towards the forward takeup reels 14 it is necessary to cause the tape 12 to engage the drive wheel. For this purpose, a starting circuit arrangement is provided which includes an input terminal 35 to which a start forward direction signal is supplied. This signal is then applied across a voltage dividing biasing network formed by a pair of resistors to the control grid of a thyratron tube 36. The thyratron tube 36 forms a conventional driver amplifier having its cathode grounded, and its anode electrode connected through the field winding of a solenoid 37 to a source of positive plate potential. The solenoid 37 has its armature connected to the midpoint of a pivoted lever arm 38 having a roller 39 mounted on the free end thereof. By this arrangement, upon a start forward drive signal being applied to the input terminal 35, sufficient current is drawn through the field winding of the solenoid 37 to cause its armature to drive the roller wheel 39 down into engagement with the thermoplastic film tape 12, and thereby force the tape 12 into engagement with the rotating forward drive wheel 25. As a consequence, the thermoplastic film tape 12 will be caused to move in the forward direction at a constant speed towards the forward takeup reel 14.

In the event it is desired to stop the movement of the thermoplastic film tape 12, a stopping circuit is provided. The stopping circuit includes a second thyratron tube 41 having its cathode grounded, and its control grid connected to an input terminal 42 to which a stop signal pulse is applied. The anode of the tube 41 is connected through the field winding 43 of a solenoid to a positive direct current power supply. The anode of thyratron tube 41 is also connected through a coupling capacitor 40 to the anode of tube 36. By this arrangement, upon the application of a stop signal to terminal 42, and thence to the control grid of thyratron tube 41, this tube is rendered conductive so as to drop its plate voltage. This results in producing a negative going signal pulse on the anode of thyratron tube 36 which turns this tube off allowing the solenoid winding 37 to be deenergized thereby allowing a biasing spring (not shown) to lift the lever arm 38 and roller 39 away from contact with the thermoplastic film tape 12. Concurrently with this action, the current supplied to the field winding 43 causes the armature 44 of the solenoid to depress a brake shoe 45 against a backing member 46 extending along the inside of the housing 11, and against which the tape 12 is allowed to ride. As a consequence of this action the brake shoe 45 positively clamps the thermoplastic film tape 12 against the backing member 46 thereby immediately stopping it. The braking circuit is such that a pulse applied to 35 for forward drive or switch 47 operated for reverse drive will release the brake shoe 45 so that the thermoplastic film tape 12 may again be moved in the forward direction by the forward drive wheel 25, or in reverse direction by the reverse drive wheel 29.

In order to cause the reverse drive wheel 29 to move the thermoplastic film 12 in the reverse direction towards the reverse takeup reel at a constant speed, a reverse drive circuit arrangement is provided. This reverse drive circuit arrangement is comprised by a solenoid 46 and a selector switch 47 connected across a source of direct current voltage having a value for example of 100 volts D.C., and an adequate current rating to energize the solenoid 46. Switch 46 also has a contact for releasing the brake shoe 45. The armature of the solenoid 46 is connected to the midpoint of a pivoted lever arm 48 having a roller 49 rotatably supported at its free end. Upon actuation of the selector switch 47 the solenoid armature drives the roller 49 into positive engagement with the reverse drive roller 29 with the thermoplastic film tape 12 disposed therebetween. As a consequence of this action the tape 12 is driven towards the reverse takeup reel 14 at a constant speed.

In order to drive the thermoplastic film tape 12 at a constant speed by either the forward drive roller 25 or the reverse drive roller 29, it is necessary that the tension on the thermoplastic film tape be maintained constant by the tape reel drive mechanisms 15 and 16. Because the tape reel drive mechanisms 15 and 16 for doing this job are identical in construction, and function in an identical manner to rotate their respective tape reels 13 and 14 to maintain the tension on the thermoplastic film tape 12 constant, only the tape reel drive mechanism 15 will be described in detail. It is to be understood however that the tape reel drive mechanism 16 will function in precisely the same manner to maintain the tension on the thermoplastic film tape 12 constant on the other side of the operating drive roller 39 or 49. In order to properly tension the thermoplastic film tape 12, a dancer arm 51 is provided having a roller 52 rotatably supported on the free end thereof about which a loop in the tape 12 is formed. The dancer arm 51 is pivotally mounted on housing 11, and is biased outwardly away from the tape 12 by a bias spring 53. The dancer arm 51 is set at a particular angle, and hence set to tension the thermoplastic film tape 12 at a particular value, by means of a spring 53 connected to the dancer arm 51. The selsyn transformer 54 is electrically connected to a selsyn generator 55. The connecting arm 56 from the selsyn transformer 54 is connected thru arm 56 and connecting rod 57 to a dash pot 58 and 59. The piston 58 and air cylinder 59 functions to add mechanical damping to the dancer arm 51 position system. The angular position thus is then transmitted by the selsyn generator 55 and the selsyn transformer 54 to the secondary of the input transformer 62. The selsyn generator 55 and selsyn transformer 54 may comprise any conventional selsyn construction such as described in chapter 3 of the textbook entitled Servo Mechanism Practice, by William R. Ahrendt, published by McGraw-Hill Publishing Company, 1954.

In order to maintain the dancer arm 51 set at a desired angular position as regulated by the adjustment of reference selsyn generator 55, and hence maintain the tension on the thermoplastic film tape 12 at a desired value, the rotor of the selsyn transformer 54 is electrically connected across an error signal developing resistor 61 connected in series with the secondary winding of an input transformer 62. The transformer 62 is connected in series with the output winding of selsyn 54 and is supplied with 60 cycle excitation voltage through relay 63 which is connected in parallel with actuating solenoid 37 such that the contacts of relay 63 close whenever the tape is being driven in the forward direction. The circuit including transformer 62 serves to increase the tension slightly in the tape 12 from reel 13 when the tape is being driven in the forward direction. The error developing resistor 61 is connected through an error amplifying network formed by a single stage linear amplifier 64 to a paraphase amplifier 65 that in turn is connected to the input of a push-pull power output amplifier 66. The single stage linear amplifier 64 may be of the type described on page 85 of the textbook by Seeley entitled Electronic Engineering, published by McGraw-Hill Publishing Company in 1958, paraphase amplifier 65 preferably is of the type described in the same Seeley textbook on page 330, and the push-pull power output amplifier is of the type described in a textbook entitled Active Networks, by Rideout, in chapter 8 thereof. The output error signal developed in the output of the push-pull power amplifier 66 is supplied through a matching output transformer 67 to one field winding 68 of an alternating current servo motor 69. The servo motor 69 has its rotor shafted to a pulley wheel 71 that in turn is connected by a pulley belt to a second pulley wheel 72 shafted to the reverse takeup reel 14. The servo motor 69 is also excited from a second field winding 73 disposed at right angles to the first field winding 68, and connected across a 60 cycle source of alternating current supply through relay 83. The switch contact 84 in conjunction with relay 83 comprises a portion of the starting and drop-out protective circuit as partially described previously and to be described more fully hereinafter.

In operation the error signal developed by the selsyn generator 55 and selsyn transformer 54 produced when the tape 12 causes the dancer arm 51 to be shifted from its set position, is amplified in the amplifier stages 64, 65 and 66 and applied back to the servo motor 69 to cause the tape reel 14 to take up or pay out the tape 12 in a sufficient amount to maintain the position of the dancer arm 51 at its preset angular position. The dancer arm can be set in any position by mutually adjusting the shaft position of selsyn 55. Thus it is possible to adjust both tension maintaining circuits such that they each maintain exactly the same tension on the tape. In this manner, the tension on the thermoplastic film tape 12 is maintained at a constant value. The servo mechanism circuit arrangement 16 is essentially the same as servo mechanism circuit arrangement 15 except insofar as the action of the circuit associated with transformer 62 is concerned. In servo mechanism circuit arrangement 16 transformer 62 is provided to introduce a small 60 cycle signal into the input of amplifier 64 when fast rewind is desired and initiated by closing switch 63 causing the reel drive servo mechanism 16 to allow tension arm 52 to move in a counter clockwise direction. This causes reel 13 to be driven in a clockwise direction by servo mechanism in an effort to keep the tape tension from decreasing. The result is that the tape is rapidly rewound from reel 14 onto reel 13.

In order to insure against improper tensioning of the thermoplastic film tape 12, over and under tension protection switches are provided on each of the dancer arms 51 comprising a part of the tape reel drive mechanisms. These protection switches are shown at 76 and 77, and comprise normally closed single pole switches having an extension 78 on the movable arm thereof which is adapted to engage the danger arm 51 in the event it travels beyond the safe limits for its range of operation. The electric circuit formed through these over and under protection switches are connected in series with the holding contacts 82 of relay 83. The armature of the switch contacts 82 is driven by a field winding 83 that in turn is actuated by a start switch 84. From an examination of the starting switch it can be appreciated that upon the start switch 84 being closed the solenoid 83 will be actuated to close the switch contacts 82. Closure of the switch contacts 82 thereby will energize the servo motors 69 and 54 and the reel drive motor 54. The over protection feature is provided by the closure of the switch contacts 82 which are then connected through the normally closed protection switches 76 and 77 on the dancer arm 51 associated with the forward drive reel 14, and through protection switches 76 and 77 on the dancer arm 51 associated with the reverse drive 13. It can be appreciated that the closure of the switch contacts 82 will then provide a holding circuit for holding the starting circuit thereby energizing the tape drive mechanism. From the foregoing description it can be appreciated that closure of the start switch 84 will serve to energize the tape reel drive mechanisms 15 and 16 so that thereafter the tape recorder is conditioned for operation either in the forward or reverse directions by supplying a forward start or a reverse start signal pulse to the forward starting circuit 35 or to the reverse starting circuit 47 whichever the case may be. If, however, the tension should become so high or low as to allow contacts 77 or 76 to open relay 83 will drop out deenergizing motors 28, 54 and 69 stopping the tape.

The details of construction of one suitable form of construction for the electron beam writing apparatus 17 are illustrated in FIGURE 2 of the drawings. For a more detailed disclosure of the construction and operation of the electron beam writing apparatus per se reference is made to U.S. Patent No. 3,120,991, issued Feb. 11, 1964, and assigned to the General Electric Company. The electron beam writing apparatus 17 includes a pair of lens assemblies (not shown) for focussing the electron beam and directing it upon the thermoplastic film tape 12 upon which the electron patterns are to be written. The lens assemblies are connected to a voltage divider network formed by a series of resistors 91 connected to a regulated direct current power supply source 92, and a one and one-half volt direct current filament supply source is connected directly to the cathode or electron emissive element of electron beam writing apparatus 17. The control grid or modulating electrodes (not shown) of electron beam writing apparatus 17 is connected to a regulated direct current power supply source 93 across a resistive coupling network, and is connected through cathode coupled direct current amplifier 94 to a source of input modulating signals 95. The intelligence to be written on the thermoplastic film tape 12 is contained in the modulating signals applied to the input terminal 95 of the amplifier 94. The electron beam writing apparatus 17 is of the type which employs a beam splitter type of control grid as explained more fully in the above identified U.S. Patent No. 3,120,991 to Newberry and Norton, and in U.S. Patent No. 3,065,295, issued Nov. 20, 1962, and assigned to the General Electric Company. Using a beam splitter, the writing electron beam is modulated with the intelligence thereby causing the electron beam produced by the apparatus to be split into several pencils or writing beams with the spacing between the electron beams being varied in accordance with the intelligence to be recorded. The thermoplastic film tape is moved past the electron beam writing apparatus 17 at a constant speed so that the electrons are deposited on the tape 12 in several long tracks with the spacing between the tracks being varied in accordance with the intelligence to be recorded. For analog recording, this track or grating spacing may vary continuously as shown at 90 in FIGURE 2*a*. In the case of digital recording, there will be only two different spacings between the tracks or gratings formed on the tape 12 as shown at 100 in FIGURE 2*a*. Prior to writing any electron patterns on the thermoplastic film tape 12 with the electron beam writing apparatus; however, the electron beam is initially aligned by temporarily removing the thermoplastic film tape 12, and causing the electron beam to impinge upon a fluorescent screen 96 aligned over a movable microscope objective lens assembly 18 which may be moved so as to position the fluorescent screen at the same location that the thermoplastic film would normally be. A movable eyepiece 19 is disposed to view the screen 96 through the objective lens assembly 18 in order to provide a visual indication of the beam spot diameter. Should it be desired to measure the beam current of the electron beam 97 a Faraday cage 98 is positioned to be moved into place on the electron beam to derive an output electrical indication of the value of the beam current. As these techniques and structural devices for electron beam characteristics are described fully in the above identified Newberry and Norton patent, a further description of the devices is believed to be unnecessary.

In the embodiment of the invention shown in FIGURES 1 and 2 it is anticipated that a long track of intelligence will be written on the thermoplastic film tape 12 which is caused to move past electron beam 97 at a constant velocity. With the intelligence thus written on thermoplastic film tape 12, it can be appreciated that a single track of intelligence defined by the brackets 90 and 100 in FIGURE 2*a* will not occupy the full width of the tape 12, and accordingly it is possible to record a number of parallel tracks along the length of the thermoplastic film tape 12. Since it is desirable that the electron beam writing apparatus 17 be permanently sealed into place on the housing 11 so as to maintain the vacuum within the interior of the housing, some means must be provided for transposing the electron beam 97 traversely with respect to the longitudinal axis of the thermoplastic film tape 12 for each track of intelligence to be written. For this purpose, the deflection electrodes of electron beam writing apparatus are connected to a pair of resistor banks 101 and 102. Each of the resistor banks such as 101 is comprised by three rheostats 103, 104 and 105 connected in series circuit relationship through a movable contact that is movable in a stepwise motion. The movable contacts of the resistor banks 101 and 102 are connected through a conventional Geneva gear drive arrangement 106 to a shaft positioning detent 107 that can be adjusted to move the movable contacts of the resistor banks 101 and 102 to 10 different positions. Each of these 10 different positions provide a different centering position of the electron beam produced by the electron beam writing apparatus 17 to thereby allow the electron beam writing apparatus 17 to write out 10 different tracks of intelligence such as is illustrated within the brackets 90 or 100 of FIGURE 2*a*, along the longitudinal axis of the thermoplastic film tape 12. The intelligence to be modulated on these tracks is then supplied to the input terminal 95 where it is applied to the modulating control grid of electron beam writing apparatus. While the particular electron beam writing apparatus 17 shown in FIGURE 2 has been described as comprising the beam splitter type of writing apparatus disclosed in the above identified copending Newberry and Norton application, it is possible by simple modifications of the circuit shown in FIGURE 2 to also use an arrangement similar to that shown in FIGURE 1 of the Newberry and Norton application wherein the intelligence modulation to be written is impressed on the deflection electrode potential.

The heating means associated with the tape recorders shown in FIGURE 1 of the drawings is illustrated more fully in FIGURE 3. This heating means comprises a probe 111 which is electrically connected through a vacuum tight insulated bushing 112 to the central conductor 113 of an air line resonant tank circuit 114. The resonant tank circuit 114 is mechanically supported in vacuum tight relation on the exterior of a housing 11, and the conductive probe 111 is mechanically supported within the housing 11 on a suitable insulating shoulder made of a material such as Teflon. The probe 111 is supported immediately over the thermoplastic film tape 12 as it passes over a Teflon roller 115 rotatably supported within the drive member 46 so that the portion of the thermoplastic film tape 12 to be heated is disposed between the Teflon roller 115 and the conductive probe 111. The spacing of the conductive probe from the thermoplastic film tape 12 is preferably in the order of about 5 mils. The inner conductor 113 of the coaxial line 114 is connected through a suitable insulating bushing to the output stage of a final amplifier adjusted for operation in the neighborhood of 40 megacycles, and may be of the type described on page 396 of the 31st edition of the Radio Amateur's Handbook. The final amplifier 116 has its input connected to the output of a crystal controlled oscillator 117 designed to operate in the 50 megacycle region at preferably of the type described in the Radio Amateur's Handbook, 31st edition, published in 1954, on page 389.

In operation, the radio frequency oscillations developed by the crystal controlled oscillator are amplified by amplifier 116 and are supplied through the air line resonant tank circuit 113, 114 to the probe 111 where they are loaded by the conductive coating of the thermoplastic film 12 to cause the surface to become heated in accordance with the power dissipated in the conductive coating.

The application of the heat to the electron patterns previously written on the thermoplastic film tape 12 causes the electrons to form permanent depression in the surface of the thermoplastic film tape 12 upon cooling in the manner described more fully in the above identified U.S. Patent No. 3,113,179 of William E. Glenn, Jr. The permanent depressions formed on the surface of the thermoplastic film tape 12 may then serve as diffracting gratings as explained in the above identified Patent No. 3,113,179 of William E. Glenn, Jr.

The details of construction of a preferred readout means used in the tape recorder of FIGURE 1 are shown in FIGURE 4 of the drawings. The readout assembly includes a high intensity monochromatic light source which is mounted on the side of the housing 11 and projects a beam of light through a vacuum tight transparent opening into the interior of the housing 11 and through the thermoplastic film 12. The monochromatic light source may comprise a high pressure mercury arc lamp 121 having its electrodes connected to a 50-volt direct current power supply source with a control rheostat 122 being connected intermediate the power supply source and the terminals of the mercury arc lamp 121. Light produced by the mercury arc lamp 121 is projected through an apertured plate 123, through an objective lens assembly 124 of conventional construction, and through a transparent vacuum tight opening in the side of the housing 11 (not shown) onto the thermoplastic film 12. As described above, the thermoplastic film 12 has had intelligence conveying diffraction gratings formed therein by the modulating electron beam of the electron beam writing apparatus 17. The light projected upon the thermoplastic film tape 12 by the light source 121 is diffracted by these gratings, and the diffracted rays directed against a field lens 125. The field lens 125 then images the diffracted rays towards an apertured plate 126. The apertured plate 126 has a pair of apertures 127 and 128 formed therein which are spaced at the center point of the first order light rays produced by the diffraction patterns in the thermoplastic film plate 12. The apertures 127 and 128 border an opaque stop 129 against which the light rays are directed in the case there is no depression or diffraction pattern formed on the surface of the thermoplastic film tape 12. FIGURE 5 of the drawings shows a plan view of the apertured plate 126, and illustrates three different positions where the light beam diffracted by the thermoplastic film 12 might fall with respect to the apertures. From an examination of FIGURE 5 it can be appreciated that the light spot produced by the first order diffractive rays for a maximum grating spacing will be located where there is a maximum grating spacing between the lines formed on the thermoplastic film 12, a light spot might fall immediately over the aperture 128, and none of the light will fall on aperture 127. Conversely, when there is a minimum grating spacing all of the light will fall within the aperture 127, and no light will fall on the aperture 128. Midway between these two extremes of grating spacings an equal amount of light will fall within both apertures 127 and 128. Referring again to FIGURE 4 of the drawings, it can be appreciated that light passing through the apertures 127 and 128 will strike a diffusing surface 131 or 132, respectively, and be reflected by the diffusion surface onto the photo sensitive face of either the photomultiplier tube 22 or 23. In this manner, electric signals are produced which are representative of the intelligence formed in the grating spacings recorded on the surface of the thermoplastic film tape 12. It can therefore be appreciated that if the maximum grating spacing can be said to represent a one in binary form, and the minimum grating spacing can be said to represent a zero in binary form, the amount of light pasing through aperture 127 or 128 can be used to represent either a zero or one in the binary number system thereby providing an output intelligence signal representative of the binary data stored in the gratings formed on the surface of the thermoplastic film tape 12. Should it be desired to use an analog recording on the surface of the thermoplastic film 12, it, of course, can be appreciated that the amount of light passing through the two apertures 127 and 128 will vary in accordance with the analog signal recorded on the surface of the film 12. As this varying amplitude light will vary the amplitude of the signal produced by the photomultiplier tubes 22 and 23, an output electric signal is derived which is the electrical analog of the recording formed on the surface of the thermoplastic film tape 12. For a more detailed description of the manner in which the optical read out system functions to develop an output electric signal representative of the intelligence in the data stored on the thermoplastic film tape 12, reference is made to the copending U.S. patent application Ser. No. 783,558, filed Dec. 29, 1958, now abandoned, William E. Glenn, inventor, entitled "Information Storage System."

The electric circuit that is connected to the photomultiplier tubes 23 and 22 is illustrated in FIGURE 6 of the drawings wherein the two photomultiplier tubes 22 and 23 are illustrated in their electric schematic diagram form. A negative 1500-volt regulated direct current power supply is connected to the photoemissive cathode of each photomultiplier 22 and 23 and a voltage dividing resistor 133 and 134, respectively, is coupled across the 1500-volt direct current power supply with the dynodes of the photomultipliers being connected to intermediate points along the voltage dividing resistors. The anode in each of the photomultipliers 22 and 23 is connected across a suitable load resistor 135 to the input of cathode follower amplifier output stages 136. Each of the cathode follower amplifiers 136 have their inputs connected to a differential amplifier 137 whose output is connected through a linear amplifier 138 to an output terminal. The photomultiplier tubes 22 and 23 may be of conventional construction as described in chapter 19 of the textbook entitled Vacuum Tubes, by CarlR. Spangenberg, published by McGraw-Hill Book Company, 1948. The cathode follower amplifiers are of conventional construction as described by the textbook entitled Electronic Engineering, by S. Seeley, on page 148 thereof, and the differential amplifier 137, and linear amplifiers are described on page 161 and in chapter 4, respectively, in the same textbook. As discussed earlier, the electric signal produced at the output terminal of the linear amplifier 138 is representative of the difference of the amount of light falling through the apertures 127 and 128, and hence is representative of the intelligence formed in the diffraction patterns recorded on the thermoplastic film plate 12. While the embodiment of the invention described above is intended for use as a sequential recorder as disclosed, it can be appreciated that the recorder can be converted to a random access type by first laying down an address track along the length of the tape 12 and incorporating a suitable address mechanism into the tape transport as will be described in connection with a third embodiment of the invention.

*Random access tape recorder*

A second embodiment of a random access tape recorder employing the principles of the present invention is illustrated in FIGURES 7 and 8 of the drawings. The random access tape recorder illustrated in FIGURES 7 and 8 of the drawings is designed to house a tape of thermoplastic film 401 which is similar in fabrication to the thermoplastic film tape 12 described in connection with the earlier described embodiment of a tape recorder shown in FIGURE 2. The tape 401 is supported between a pair of takeup and drive wheels 402 and 403, respectively, with the tape 401 being driven in either direction by a sprocket drive wheel 404. The sprocket drive wheel 404, together with auxiliary equipment to be described more fully hereinafter, is designed to selectively place any desired portion on the length of the thermoplastic film tape 401, under either an electron beam writing tube 405, or under a read-out means 406. Electron beam writing tube 405 has a pair of radio frequency heating electrodes 407 secured to the end thereof adjacent to the tape for the purpose of curing electron patterns after the patterns have been written on the thermoplastic film tape 401 by the electron beam writing tube 405. For convenience in aligning the electron beam prior to writing on the thermoplastic film tape 401, a fluorescent screen and objective lens assembly 408 is provided for viewing the beam. The readout means comprises a flying spot scanner tube 406 positioned on the opposite side of the thermoplastic film tape 401 from a pair of photomultiplier tubes 409 and 411. The photomultipliers 409 and 411 have light directed thereto from the flying spot scanner after passing through the data tracks in the thermoplastic film tape 401 by a suitable imaging lens assembly 410 mechanically supported along with the photomultiplier tubes 409 and 411 over the thermoplastic film tape 401.

*Tape transport mechanism*

The details of construction of the mechanical transport mechanism system including the drive sprocket wheel 404 for causing the thermoplastic film tape 401 to be accurately moved with respect to the electron beam writing apparatus 405, or the readout means 406, are shown more clearly in FIGURE 8 of the drawings. The drive sprocket wheel 404 is keyed to a shaft driven by a gear 412 and differential gear arrangement 413 of conventional construction. This gearing arrangement in turn is driven through a third gear 414, shafted directly to the rotor of a horizontal course drive direct current electric motor 415, that in turn has its shaft connected to a brake 416. Keyed to the shaft at a point intermediate the differential gears 413 and the third set of gears 414, is a second sprocket wheel 417 having magnetic counting teeth equal in number to the sprocket spokes on the drive sprocket wheel 404, and which are caused to be rotated past a magnetic counting device 418. The differential gear arrangement is also connected through a second gear box 419 to a pair of step motors 420 and 421 which act in opposite directions to cause the drive sprocket wheel 404 to be stepped one tooth at a time rotationally in either the forward or reverse direction. It is understood that where the tape 401 is moved towards the takeup reel 403 it is being moved in the forward direction and where it is being moved towards reel 402 it is being moved in the reverse direction. By this arrangement, the horizontal course drive DC motor 415 can be actuated to cause the drive sprocket wheel 404 to drive the thermoplastic film tape 401 along its longitudinal axis in either direction at a relatively fast speed to position any desired point along the tape under either the electron beam writing apparatus 405 or the readout assembly comprised by flying spot scanner 406. As will be explained more fully hereinafter, after the tape has been driven horizontally to the vicinity of a desired location, the coarse drive DC motor 415 is switched out of action through the differential gearing arrangement, and either the reverse or forward step motor 421 or 420 is placed into action to cause the tape 401 to be stepped into the desired position.

In order to accurately position a desired block on the thermoplastic film surface of the tape 401 under either the electron beam writing apparatus 405 or the readout means 406, a fine position drive mechanism is provided which includes a horizontal fine drive motor 424 shafted to a brake mechanism 425, and to an electrically actuated clutch 426. The clutch 426 is shafted to a small pinion gear 427 that operates in conjunction with a rack secured on a longitudinally movable sled 428. The sled 428 supports the reverse and forward take up reels 402 and 403, respectively, and the drive sprocket wheel 404, and is slidably supported on a bifurcated supporting member 429 by means of a pair of bearing posts indicated at 431. By means of this arrangement the fine positioning motor 424 acts through the pinion gear 427 and rack connected to sled 428 to accurately move the sled 428 to the right or to the left of the plane of the drawing to thereby accurately locate any desired point on the surface of the thermoplastic film tape 401 with respect to the writing apparatus or the readout arrangement. In order to insure that the sled 428 stays centered on the bifurcated supporting member 429 during periods that the horizontal coarse drive motor 415 is driving tape 401, a centering arrangement is provided. This arrangement is comprised of a post 432 which protrudes from the sled 428, and is disposed between a pair of spring biased supporting arms 433 and 434 slidably mounted on an extension 435 of the bifurcated supporting member 429. By this arrangement, after the fine positioning motor 424 has been actuated to properly position the sled 428, and upon subsequent deenergization of the fine motor 424 and clutch 426, the biasing springs 434 and 433 will return the sled 428 to the center position of the bifurcated supporting member 429.

It is anticipated that the data will be written on the thermoplastic film tape 401 in small blocks formed of about 32 lines of information with each line containing 32 bits of information. The lines will be spaced apart about one mil from center to center, and the bits in each line likewise will be spaced apart about one mil from center to center. Accordingly, with the block laid out in this manner, each block would occupy approximately 32 mils across the width of tape 401. There will be 32 such blocks as indicated at 437 in FIGURE 8 across the width of the tape with the space between each block being approximately 5 mils. It is anticipated that the fine positioning servo will be able to position the thermoplastic film tape 401 sufficiently accurately with respect to the readout means 406 and the electron beam writing tube 405 to bring any desired vertical line of such blocks of data within the purview of either the electron beam writing tube or the readout means whichever the case may be. For doing this, the first line of blocks of data 438 across the entire length of the thermoplastic film tape 401 constitutes an address track wherein the address of any one of the $2^{13}$ or 8192 vertical lines of blocks will be recorded by simply recording such an address in every line of the address block on the address track. Since 32 bit locations are available in each block line and only 13 bits are required for the address, the remaining 19 bit locations will be filled up with zeros. This simplifies the problem of centering the readout means when addressing along the tape to a particular vertical line of data blocks. Upon reaching a desired vertical line of data blocks 437, it is necessary to address vertically along the width of the tape to position a desired block of 32 x 32 bits of information under either the readout means 406 or the electron beam writing apparatus 405. For this purpose the bifurcated supporting mount 429 is movably supported on a slide 439, and is driven up and down in the plane of the drawing along the slide by a rack 441 and pinion 442. The pinion 442 is driven by a shaft connected through a gear box 443 to a motor 444 that in turn is shafted to an electrically actuated brake 445. A second rack 446 parallel to the driving rack 441 is connected through a pinion gear arrangement 447 to a pair of Selsyn control transformers 448 and 449. By this arrangement an address can be supplied to the driving motor 444 which will drive the bifurcated supporting mount 429 transversely with respect to the longitudinal dimension of thermoplastic film tape 401 to position any desired block of data in a selected vertical line of such blocks of data within the view of either the electron beam writing apparatus 405, or the readout means 406, as will be described more fully hereinafter.

In order that the thermoplastic film tape 401 will be properly tensioned for movement by the sprocket drive wheel 404, each of the forward and reverse take up reels 403 and 402, respectively, is driven by motors 451 and 452, respectively. The motors 451 and 452 co-act with a dancer arm arrangement 453 and 454, respectively, together with Selsyn control transformers 455 and 456 in a servo-mechanism arrangement similar to that described with relation to the tape recorder shown in FIGURE 1 of the drawings, to maintain the tension on the thermoplastic film tape 401 substantially constant. The entire apparatus will then be supported within a vacuum-tight housing, indicated by the broken line 457 so that the interior of the housing can be evacuated to facilitate writing with the electron beam writing apparatus 405. As the mechanical details of construction of such a housing are believed to be obvious in the light of the disclosure in FIGURE 1, it has not been illustrated in detail in FIGURES 7 and 8.

FIGURE 9 of the drawings illustrates the electrical control circuitry used with the horizontal drive motors 415, 420, and 421 to properly drive the sprocket wheel 404 to place a desired block of data on the thermoplastic film tape 401 under either the electron beam writing apparatus 408 or the readout means 406. For this purpose, the computer or other intelligence device with which the recorder is being used will supply the horizontal address of the desired position to an address shift register shown in FIGURE 11 of the drawings and to be described more fully hereinafter. After storing the desired horizontal address in the address shift register of the recorder, the computer will supply a seek signal through the input terminal 461 which is then applied to the set input terminal of a flip-flop amplifier 462. The flip-flop amplifier 462 is a conventional bistable multivibrator of the type described in chapter V of the above identified Millman and Taub textbook, and has two stable states of operation. Upon being triggered to its SET condition by the seek signal from the computer, the flip-flop 462 will supply a negative enabling potential from its normal output terminal to an output terminal 463 which is connected to a similarly marked terminal on the reading circuits shown in FIGURE 12 of the drawings, and serves to set the electron beam of the flying spot scanner readout tube 406 to the center of the screen. This enabling potential is also supplied to an output terminal 464 which is connected to a similarly marked terminal on the vertical drive circuits of the recorder shown in FIGURE 10 of the drawings. This signal will cause the vertical drive circuit to move the thermoplastic film tape carriage vertically in whatever vertical line of data blocks it is then located so as to bring the address data block under the flying spot scanner readout tube as will be described more fully hereinafter in connection with the description of the vertical drive circuit shown in FIGURE 10. The enabling potential produced at the normal output terminal of flip-flop 462, when it is set by the seek signal from computer, is also applied over a conductor 465, to an "AND" gate 466. The "AND" gate 466 is of conventional construction as described in chapter II of the textbook entitled Digital Computer Components and Circuits, by R. K. Richards, published by the D. Van Nostrand Company, 1957, and has a second enabling potential supplied thereto from an "OR" gate 467. The "OR" gate 467 has one input connected to a terminal 468 which is connected to a similarly marked terminal in the vertical drive circuits shown in FIGURE 10 of the drawings. Thus, upon the vertical drive circuits having caused the vertical drive motor 444 to move the carriage of the tape vertically to position the address data block of the tape under the readout means 406 as mentioned above, a vertical drive finish signal pulse will be applied over the input terminal 468 through "OR" gate 467 to "AND" gate 466.

Upon the occurrence of the vertical drive finished signal "AND" gate 466 will open, and apply a setting input pulse to a flip-flop amplifier 469, and to a second flip-flop amplifier 470. Flip-flop 470 on being set by the enabling potential from "AND" gate 466 will produce an enabling potential at its normal output terminal which is supplied through an amplifier 471 across a conductor 472 to a run relay 473 connected in the energization circuit of the horizontal fine drive motor 424. The fine drive motor 424 will then cause the address block of the particular vertical line of data blocks with which the readout means 406 is aligned, to be exactly positioned under the face of the flying spot scanner tube 406 so that the address of the particular location can be accurately read out in a manner to be described more fully hereinafter in connection with the reading system shown in FIGURE 12 of the drawings. Upon the address block being exactly centered under the readout flying spot scanner 406, an address block centered signal pulse will be developed by the reading circuits of FIGURE 12, as will be explained more fully hereinafter, and is applied over the input terminal 475 to the reset input terminal of flip-flop 470. This causes the flip-flop 470 to reset so that an enabling potential is produced at its inverse output terminal and supplied to an "AND" gate 476. The "AND" gate 476 has had its other input terminal provided with enabling potential by the flip-flop 469 when it was initially set by the "AND" gate 466 from the vertical drive finished signal pulse applied through input terminal 468. Accordingly, "AND" gate 476 will provide an enabling pulse to the set input terminal of a flip-flop 477. The flip-flop 477 in being triggered to its set condition will produce an enabling potential at its inverse output terminal which is supplied to a terminal 478 that is connected to a similarly marked terminal 478 in the reading system of FIGURE 12 of the drawings, as will be explained more fully hereinafter. This enabling potential constitutes a start-read signal pulse to the reading circuits, and will cause the reading circuits to read out the address recorded in the address block centered under the flying spot scanner readout means 406.

The address readout by the reading circuits is supplied to a serial subtractor comprising a part of the address comparator circuits shown in FIGURE 11 of the drawings. As will be explained more fully hereinafter in the connection with the address comparator circuit of FIGURE 11, the address comparator serves to compare the address of the vertical line of data blocks located under the readout means 406 to a desired address, and to control the operation of the horizontal drive circuits to bring the two addresses into coincidence. Subsequent to this action, a readout finished signal pulse is supplied over the input terminal 479 from the reading system. This readout finished signal pulse is applied to the reset input terminal of flip-flop 477 to reset or turn off that flip-flop. The readout finish signal supplied from the reading circuits through the input terminal 479 is also applied to the set input terminal of a flip-flop amplifier 483. Upon being triggered to its set condition, the flip-flop 483 will apply an enabling potential through the conductor 484, and amplifier 485 to a run relay 486 controlling the horizontal coarse drive motor 415, and to a dropout relay 487 for actuating the clutch 426 in the fine positioning drive motor 424.

Closure of the movable contacts of run relay 486 will cause an actuating potential to be supplied from a power supply terminal 488 through the normally closed contacts of a slow-down relay 489, and through the normally closed contacts of a selector switch 491 to the direct current coarse horizontal position drive motor 415. Assuming the motor 415 to be rotating in the right direction to cause the drive sprocket wheel 404 to move the tape 401 in the right direction to minimize the difference between the desired address, and the address then under the readout means 406, then the setup just described will continue. However, in the event that the motor 415 has to be run in the reverse direction in order to minimize the distance between the desired address and the existing address, a run in the reverse direction signal potential will be applied from the comparison circuit of FIGURE 21 over an input terminal 481 through an amplifier 492 to the field winding 493 of a reversing relay for reversing the selector switch contacts 491 on the coarse drive motor 415. This reversing potential is also applied over conductor 494 to the field winding 495 of a reversing relay having its contacts 496 connected to the field winding of the step motors 420 and 421. Accordingly, this run in opposite direction signal pulse applied through the input terminal 481 will cause the coarse motor 415 to rotate the driving sprocket wheel 404 in a direction to minimize the difference between the desired address, and the existing address under the readout means 406.

As the driving sprocket wheel 404 is rotated by the horizontal coarse drive motor 415, a counter signal is developed by the magnetic pickup counter 418 operated in conjunction with the magnetic sprocket wheel 417. The magnetic pickup counter 418 develops counter signal pulses representative of the travel of the driving sprocket wheel 404 and hence, representative of the travel of the thermoplastic film tape 401. These counter pulses are supplied through an amplifier 501 and an "AND" gate 502 to an "OR" gate 503. The "OR" gate 503 has its output terminal connected to a terminal 504 which is connected to a similarly marked terminal on the address comparison circuit shown in FIGURE 11. These counter pulses are supplied to the address comparison circuit, and are counted by the comparison circuit in a shift register to minimize the difference between the desired address and the last read out address stored in the address comparison circuit as the tape is moved by the horizonal coarse drive motor 415. Upon reaching the proximity of the desired address, the horizontal address comparison circuit will develop a slow down signal pulse which is applied to an input terminal 505 shown at the upper right-hand corner of FIGURE 9 of the drawings. This slow down signal pulse is supplied through an amplifier 506 to a switching relay 507 that serves to supply an enabling potential through its movable contact 508 to the movable contact 509 of a cam operated timing switch driven by a motor 511. The cam motor 511 is a continuously running motor which will have no effect until supplied with an energizing potential by the closure of the switch contacts 508. Closure of the switch contacts 508 will also serve to remove the enabling potential from the conductor 512 thereby disenabling the "AND" gate 502 and preventing further counting pulses developed by the magnetic pickup 418 from being supplied to "OR" gate 503. Instead, the enabling potential supplied through the movable contact 508 is applied across a second cam operated contact 513 to a second input terminal of an "OR" gate 503 and therethrough to terminal 504 which is connected to a similarly marked terminal on the address comparison circuit shown in FIGURE 11. The cam operated switches 509 then, as it is sequentially opened and closed, will serve to apply stepping pulses to either the forward step motor 421, or the reverse step motor 420, depending upon which motor is connected in the circuit by the reversing relay contact 496. The step motors 420 or 421 then cause the drive sprocket wheel 404 to step the thermoplastic film tape 401 toward the desired address. Concurrently the step counting pulses developed by the cam operated contacts 513 supplied to "OR" gate 503 are supplied through terminal 504 to the horizontal address comparison circuits shown in FIGURE 11 where they are applied to the shift register to further tabulate the diminishing difference between the desired address, and the address previously read out by the readout means 406. In addition to the above operation, the slowdown signal pulse applied through the input terminal 505 is also applied across the conductor 515 to the slowdown relay winding 489 to cause it to open its normally closed switch contacts, thereby removing the energizing potential applied through the input terminal 488 from the horizontal coarse drive motor 415. Removal of this potential will also cause the brake 416 to lock on the shaft of the horizontal coarse drive motor 415 to keep it from further rotation. Additionally, an enabling potential will be applied over the conductor 516 through the terminal 517 to the computer to serve as an enabling potential to indicate to the computer that data recorder has almost reached the desired horizontal address.

When the step motor 420 or 421 has caused the thermoplastic film tape 401 to position the desired address under the readout means 406, the address comparison circuit shown in FIGURE 21 will produce a stop horizontal drive signal pulse which is applied over the input terminal 521 to the reset input terminal of flip-flop 483, and to one input terminal of an "AND" gate 522. It should be noted that the remaining input terminal of "AND" gate 522 has a potential supplied thereto from the reading circuit through the input terminal 479 which potential represents that the reading circuit has completed reading of the address block. Upon initially reaching the desired horizontal address there will be no potential on the input terminal 479 so that "AND" gate 522 will fail to open. The flip-flop 483, however, will be triggered from its set to its reset position by the stop horizontal drive signal pulse supplied over terminal 521 thereby removing the enabling potential from the run relay 486 and the relay 487 that actuates the clutch 426. Flip-flop 483 in being triggered to the RESET condition does provide an enabling potential over the conductor 523 to "OR" gate 467. The provision of this enabling potential to the "OR" gate 467 will then open the "OR" gate and apply a trigger pulse to "AND" gate 466 which still has an enabling potential supplied thereto from the flip-flop 462. Accordingly, the "AND" gate 466 will open and apply a setting pulse to the flip-flops 469 and 470 thereby triggering off a new reading cycle by the reading system of FIGURE 12 to cause it to read out the address block then positioned under the readout flying spot scanner 406. Upon the completion of the reading out of the address block, and assuming that the address block is the desired one, then an enabling potential will be applied through the input 479 to "AND" gate 522 concurrently with an enabling potential applied through the input terminal 521. This is due to the fact that the desired address in the address shift register of the comparison circuits of FIGURE 11 and the address being read out, coincide.

Coincidence of these two enabling potentials applied to the input terminals of "AND" gate 522 will then cause this "AND" gate to open and provide resetting trigger pulses to the flip-flops 462 and 469. Resetting of the flip-flops 462 and 469 will then disenable the horizontal drive circuits, and the recorder is then in the correct horizontal position along the length of the thermoplastic film tape 12.

*Vertical drive circuit*

The next step in the operation of the recorder is then for the controller to cause the vertical drive circuits of the tape recorder to move the tape recorder carriage transversely with respect to the longitudinal axis of the thermoplastic film tape 401 to cause the desired data block in the selected vertical line of data blocks to be positioned under the readout means or the writing head, whichever is the case. The vertical drive circuits for the random access tape recorder are disclosed in FIG. 20 of the drawings. The vertical drive circuit comprises an input address shift register having the vertical address of the desired block of data on the thermoplastic film tape 401 supplied to the input terminal 531, together with clock shift signal pulses supplied to the input terminal 532. The input terminal 531 is connected to the trigger input terminal of the first flip-flop amplifier 533a in the shift register. The shift register is further comprised by five other such flip-flop amplifiers 533 having their trigger input terminals connected to the inverse output terminal of the preceding flip-flop amplifier 533 in the shift register through delay devices 534. The first five flip-flop amplifiers 533a through 533e, also have their reset input terminals connected to the terminal 532 of the clock signal pulses which serve to shift data being read into the first flip-flop amplifier 533*a* from the data input panel 531 through the shift register. The last flip-flop 533*f* in the string of flip-flops forming the input address shift register contains the instruction as to whether the thermoplastic film tape recorder is to write or to read out data from the tape 401. In the event that the instructions from the computer are for the recorder to write, then a potential will appear on the inverse output terminal of the last flip-flop 533*f* and will be applied to the terminal marked 535. In the event that the instructions are for the random access thermoplastic film tape recorder to read out information previously stored on the tape 401, then the flip-flop 533*f* will be conditioned so that an enabling potential appears on its normal output terminal and is applied to the terminal marked 536. This potential is supplied through an amplifier 537, and selector switch 538 to the actuating coil 539 of a read-write relay having its movable contact 541 adapted to selectively connect the rotor winding 542 of selsyn 449, or the rotor winding 543 of selsyn 448 across the error energization circuit of the field winding of the vertical drive motor 444. For this purpose, the movable contact 541 is connected through the field winding 544 of a tachometer generator 545 comprising a part of a servo mechanism which further includes the selsyn systems 448 or 449 geared to tape carriage 429 and vertical drive motor 444. The field winding 544 is connected in series with a load resistor 546 which has a movable contact connected through an amplifier 547 of conventional construction across the field winding 548 of the vertical drive motor 444. The vertical drive motor 444 is also excited by a reference field winding 549 connected across a 60 cycle source of alternating current supply, and positioned at right angles to the error field winding 548. The rotor of the vertical drive motor 444 is mechanically shafted to the brake 445, and through gears 443 and 442 to the tape carriage 429 upon which the thermoplastic film tape forward and reverse takeup reels 402 and 403 are mounted. The brake 445 is electrically controlled through a selector switch having a first set of movable contacts 551 actuated by the armature of a sensitive relay whose field winding 552 is connected across the error field winding 548 of vertical drive motor 444. The armature of the sensitive relay 552 is also connected to a second movable contact 553 connected in circuit relationship with a source of negative energizing potential, and is used to develop a vertical drive finished signal when the error signal across the error field winding 548 drops to zero. Accordingly, when the error signal across winding 548 drops to zero the sensitive relay 552 is dropped out, thereby releasing brake 445, and the circuit through the switch contact 553 is closed to provide a vertical drive finished signal pulse through output terminal 468.

From the above description, it can be appreciated that the error signal appearing across the error field winding 548 of vertical drive motor 444 is determined by the error voltage appearing across the resistor 546, and that this error voltage is in turn determined by the error voltage developed in the selsyn rotor winding 542 or 543, depending upon which selsyn winding is connected in the circuit. The error voltage developed in the selsyn rotor windings 542 or 543 is in turn dependent upon the address voltages supplied to the stator windings 449 or 448 respectively of the selsyn generators which are, of course, determined by the address supplied to the vertical address shift register comprised by the flip-flop amplifiers 533*a* through 533*e*. The vertical address read into the vertical address register comprised by flip-flop amplifiers 533*a* through 533*e* is supplied through a pair of diode switches 555 and 556 to a set of output amplifiers 557 or 558 respectively. The diode switches 555 and 556 comprise conventional pyramid diode matrices of the type described on page 41 of the textbook entitled "Digital Computer Components and Circuits," by R. K. Richards, published by the D. Van Nostrand Company in 1958. The diode switches function to selectively connect desired ones of the outputs of the vertical address shift register flip-flops 533*a* through 533*e* to the input of the respective associated output amplifiers 557 and 558. The output amplifiers 557 and 558 are connected to respective associated holding magnet solenoid windings 559 and 561, respectively, which serve to actuate holding magnets in a pair of crossbar switches 562 and 563, respectively. The crossbar switches 562 and 563 are of conventional construction such as described on page 194 of the textbook entitled, "The Design of Switching Circuits," by W. Keaster, A. E. Ritchie and S. W. Washburn, of the Bell Telephone Laboratory Technical Staff, published by the D. Van Nostrand Company in 1951. By selective actuation of the holding magnets 559 and 561, the crossbar switches 562 and 563 will function to connect a selected portion of the secondary windings 564 and 565 of a pair of 60 cycle input transformers 566 and 567, respectively, across the stator field windings of the selsyns 448 and 449. In this manner, a voltage will appear across the stator field windings of the selsyns 448 and 449 which is related to the desired vertical address of the block of data identified in the vertical address supplied to the vertical address register formed by the flip-flops 533*a* through 533*e*. This voltage will then induce an error voltage in either one of the rotor field windings 542 or 543 dependent upon which one is connected in circuit relationship with the error load resistor 546 by selector switch 541. This error voltage will then be applied to the error field winding 548 to cause the vertical drive motor 444 to drive the tape carriage 429, in a direction to minimize the error voltage. Since the tape carriage 429 is mechanically connected to the rotors 542 and 543 of selsyns 449 and 448, respectively, when the error voltage has been reduced to zero, then the tape carriage 429 will be in the proper position to locate the desired data block in position under either the readout head 406 or the electron beam writing apparatus 405, dependent upon which one has been selected. Upon this occurrence, the error voltage across the sensitive relay winding 552 will have dropped to zero so that the switch contact 551 opens, thereby setting brake 445 to keep the vertical position of the tape carriage 429 in the selected location. Simultaneously, the spring bias on the movable contacts 551 and 553 of the sensitive relay will cause the contacts 553 to close, thereby producing a vertical position finished signal pulse which is supplied through terminal 468 to the horizontal drive circuitry and to the controller of the tape recorder.

As explained earlier in connection with the horizontal drive circuits of FIG. 9 of the drawings, upon the tape recorder being first supplied with a seek signal command from the computer, it is necessary to first obtain a reading from the address track to determine what data block location along the longitudinal axis of the thermoplastic film tape 401 is positioned under the readout means 406. Because each address block in the address track has the same vertical position along the width of the thermoplastic film tape 401 for all vertical lines of data blocks, it is possible to provide only a simple modification to the vertical drive circuitry of FIG. 10 to accomplish proper positioning of the thermoplastic film tape 401 with respect to the readout means to determine which address block is located under the readout means. For this purpose, the seek signal supplied from the computer to the horizontal drive circuit of FIG. 9, triggers a flip-flop 462 to its set condition so that an enabling potential is supplied through the terminal point 464. This enabling potential is connected from the terminal point 464 through an amplifier 561 having its output connected across the solenoid field winding 562 of a relay whose armature is mechanically connected to the selector switch 538, to a second selector switch 563, and to a third selector switch contact 564. By this arrangement, upon an enabling potential being applied to the input terminal 464, the selector switch contact 538 is closed through a resistor to ground so that a bias spring on selector switch 541 automatically causes switch 541 to close on the readout selsyn winding 542, concurrently, the switch contact 563 in the connector from crossbar switch 563 to selysn stator winding 455 is closed on the fixed contact of a conductor 565 connected across the secondary winding 566 of a transformer 567. The movable switch contact 564 likewise, is disconnected from the conductor from crossbar switch 562, and is connected to a conductor connected across a secondary winding 568 of transformer 567. Transformer 567 has its primary winding connected across a 60 cycle alternating current supply so that a reference potential is supplied across stator winding 549 of the readout selsyn generator. As a consequence, a standard reference error signal will be developed in the readout selsyn rotor winding 542 which will automatically cause the vertical drive motor 444 to drive the tape carriage 429 to bring the address block into vertical register with readout system 406.

*Reading system*

The reading system employed in conjunction with flying spot scanner tube 406 and the two photomultiplier tubes 409 and 411 to derive intelligence signals from the data recorded on the thermoplastic film surface tape 401, is illustrated in FIGURE 12 of the drawings. The manner in which the data tracks are written on the thermoplastic film tape 401 has not been disclosed in that the writing circuits are identical to those described and illustrated in United States patent application Ser. No. 756,775, filed Aug. 25, 1958, now abandoned and refiled as continuation application Ser. No. 263,442, filed Mar. 7, 1963, now Patent No. 3,225,335, entitled "Thermoplastic Film Data Storage Equipment," William C. Hughes, John E. Wolf, and William E. Glenn, inventors, assigned to the General Electric Company. In particular, the writing circuits of the recorder which are illustrated by the block 571, is identical in construction and operation to the writing system block diagram illustrated in FIGURE 28 of the above identified copending Hughes, Wolf and Glenn application, and reference is made to that disclosure for a more complete description of the writing circuits. It is believed sufficient to point out that the writing circuits are capable of writing a complete block of data comprising 32 lines of 32 bits of information each. The data bits comprise small light diffraction gratings wherein a bit representing a 1 in binary form, for example, will have a grating spacing of one dimension, and a second bit representing a zero in the binary number system will have a grating spacing of another dimension. These two differently spaced gratings are formed by a beam writer type electron beam writing apparatus as explained more fully in the above identified copending application of Wolf, Hughes and Glenn. The data bits are written side by side along a continuous line, and are formed by laying down grating lines or bars of electrons on the thermoplastic film surface of the tape 401, and subsequently heating the electron patterns thus formed which then cause the electrons to form permanent depressions in the thermoplastic film surface of the tape 401 which will act as light diffraction gratings upon being illuminated with a light spot having a diameter capable of encompassing one bit of information. By scanning the light spot across each bit sequentially, the intelligence contained in the bit pattern may be read out by the system described hereinafter.

The reading system includes a master clock oscillator 572 which may comprise any conventional crystal controlled oscillator whose output signal frequency is set to match the bit frequency used in writing the bits of information by the writing circuits. The master clock oscillator 572 has its output supplied to the writing circuits and supplied to the reading system through a frequency divider network 573 of conventional construction. The frequency divider 573 serves to divide the bit frequency rate signal down to the line frequency rate, and to supply the line frequency synchronizing signal pulses to the horizontal sweep potential generator circuits 574, and to a one shot multivibrator 575. The horizontal sweep potential generator circuit 574 is of conventional construction as described more fully in the above identified copending Wolf, Hughes, and Glenn application, and has its output connected through a horizontal drive amplifier circuit 576 to the horizontal deflection electrodes of the flying spot scanner tube 406. The reading system also includes a vertical sweep generator 577 of conventional constructions whose operation is triggered off by a start-read signal supplied to the input terminal 578 from the controller unit shown in FIGURE 13 of the drawings. The vertical sweep generator 577 will then supply a saw tooth wave shape vertical sweep potential through a vertical drive amplifier 579 to the vertical deflection electrodes of the flying spot scanner tube 406. The start-read signal pulse applied to the reading system through the input terminal 578 is also applied over a conductor 581 to the reset input terminal of a flip-flop 582. Upon being reset, the flip-flop 582 will produce an enabling potential at its normal output terminal which is supplied through an OR gate 583 to the control electrode of a gating electrode tube 584 which serves to unclamp the power supply potential to the control grid of the flying spot scanner tube 406. Since the gating potential from the OR gate 583 will be negative in polarity, conduction through the gating tube 584 is minimized thereby raising its plate potential which is applied through the conductor 585 to the control grid of the flying spot scanner tube 406. Conventional auxiliary circuits indicated at 586 are provided for applying energizing potential to the flying spot scanner tube 406.

The combined effect of the horizontal sweep generator 574 and vertical sweep generator 577 causes the scanning electron beam of the flying spot scanner tube to produce a scanning beam of light on its fluorescent face which is scanned across the data blocks on the thermoplastic film surface of the tape 401 in the manner illustrated in FIGURE 12*a* of the drawings. FIGURE 12*a* shows a fragmentary portion of one data block wherein the grating spacings embraced by the numerals 591, will represent a zero and the grating spacings embraced by the numeral 592 will represent a 1. It can be appreciated that the spacing between the grating in the case of the zeros is much wider than the spacing between the gratings representing the 1's. The track of the scanning beam of light is indicated by the dotted lines 593, 594, 595 and 596. A block edge recognition circuit comprising a part of the reading system and to be described more fully hereinafter, causes the scanning beam of light to trace across a path such as is indicated by 593. At this point, it can be appreciated that the light is above the block of data and hence, that no data output signal will be derived. On the next path 594, traced out by the scanning beam of light, a data output signal will be produced. Thereafter, the blocking edge recognition circuits will cause the scanning beam of light to count down two scan paths until it comes to the position indicated by the broken line 595. At this position, the block edge recognition circuits will allow the data contained in the data blocks 591, 592, to be read out of the reading system circuitry.

The light which is diffracted by the gratings 591 and 592 in the data blocks is caused to fall upon either the photomultiplier 409 or 411, dependent upon whether the grating spacing represents a zero or a 1. The photomultipliers 409 and 411 have their outputs connected to a differential amplifier 601, having its output connected through a video amplifier 602 to a line frequency synchronous clamp 603. The line frequency synchronous clamp has an input gating signal supplied thereto from a one shot multivibrator 575 connected to the output of the line frequency divider 573. The one shot multivibrator 575, functions to derive line frequency gating pulses that are applied to the synchronous clamp 603 for restoring the DC level of the data supplied thereto from photomultipliers 409 and 411 at the end of each line. The lines of data are then supplied through a phase splitting network 604, of the type described in the above identified textbooks by Seeley on page 161. The phase splitter 604 converts the compositive square wave signal representing the zeros and 1's supplied thereto from photo multiplier tubes 409 and 411 into negative going and positive signal pulses, respectively. The two sets of signal pulses are then applied through wave shaping circuits comprising a clipper circuit 605 connected through a Schmitt trigger circuit 606, and a second clipping circuit 607 having its output connected to a Schmitt trigger circuit 608. By this arrangement, the output from the two Schmitt trigger wave shaping circuits 606 and 608, constitute a series of negative going square wave signal pulses representing the zeros in the data in the case of the Schmitt trigger circuit 606, and representing the 1's in the data in the case of the Schmitt trigger circuit 608. This data signal at the output of Schmitt trigger circuit 608, may then be supplied through an AND gate 609, and a second AND gate 611 to a core storage unit 612 comprising a part of the data recorder system in a manner to be described more fully hereinafter.

In order to gate on the AND gate 609 and 611 at the proper time to obtain the readout from the data supplied from Schmitt trigger output circuit 608, both of the Schmitt trigger circuits 606 and 608 have their outputs connected to an OR gate 613. The OR gate 613 serves to combine the output signals of both the Schmitt trigger circuits 606 and 608 so that an elongated square wave signal potential is provided having a duration determined by the length of the lines of the data. This elongated square wave potential can be used as a block edge recognition enabling potential, and for this purpose is supplied to a flip-flop amplifier 614, to an AND gate 615, to a third AND gate 616, and to a fourth AND gate 617. For block edge recognition purposes, upon the flip flop 614 receiving an enabling potential from OR gate 613, it in turn is triggered to its SET condition, and provides an enabling potential to an AND gate 618. Upon receiving this enabling potential the AND gate 618 opens, and allows the line frequency clock pulses supplied from one shot multivibrator 575 to be applied to the trigger input terminal of the flip flop amplifier 619. The flip flop amplifier 619 in conjunction with a second flip flop -amplifier 621, comprises a count to 3 counter network so that the network serves to count up to 3 line frequency clock pulses prior to providing enabling potentials to an AND gate 622. The need for the count to 3 network 619 and 621 can best be appreciated from an examination of FIGURE 12*a* of the drawings, wherein it can be seen that when the scanning beam of light produced by the flying spot scanner 506 traces across the path indicated at 593, no output signal enabling potential will be developed by the OR gate 613 since no light will be passing through a data bearing grating such as 591 or 592. However, upon the scanning beam of light reaching the light scan path indicated at 594, data output signals will be derived by the photomultipliers 409 and 411 which are supplied to the OR gate 613. Thus, OR gate 613 will provide an enabling potential to flip flop 614 which will then open AND gate 618, and apply line frequency clock pulses to the counter formed by flip flops 619 and 621. The count by 3 network formed by flip flops 619 and 621 will then cause three line traces to be counted out before enabling AND gate 622. AND gate 622 will be enabled at the beginning of the fourth line scan indicated by trace line 595 which, as can be seen from FIGURE 12*a* of the drawings, is located approximately midway the length of the data blocks 391 and 392. Opening of AND gate 622 will provide a set trigger pulse to the set input terminal of a flip flop amplifier 623. Flip flop 623 in being triggered to its SET condition will then provide an enabling potential from its normal output terminal to AND gates 611 and 616, and to an additional AND gate 624 in the readout circuit. Additionally, an enabling potential will be supplied over the conductor 625 to the vertical sweep generator 577 to cause a change in the waveshape of the sweep potential being produced by the vertical sweep potential generator 577. The need for the change in the vertical sweep potential can be appreciated from an examination of FIGURE 12*a* wherein it can be seen that at the midpoint of the first line of data blocks 591 and 592, represented by the scan line 595, it is desirable for the next scan line to jump down to the position 596 where it will be located approximately along the midpoint of the second line of data blocks 591 and 592. The enabling potential applied over the conductor 625 provides for this change in the vertical sweep potential rate.

In order to read data out of the thermoplastic film tape 401, and store it in the working core storage 612 comprising a part of the recorder, it is first desirable to clear the core storage of any data contained therein. For this purpose a one shot multivibrator 627 is provided which has its input connected to the output of AND gate 616. Hence, upon an enabling potential being applied to the AND gate 616 from flip flop 623, at the beginning of the readout scan indicated by line 595 in FIGURE 12*a*, AND gate 616 will open and apply a triggering pulse to one shot multivibrator 627, since it already has been supplied with an enabling potential from OR gate 613. The one shot mulitvibrator 627 will then serve to clear one line of the core storage 612 of any data previously stored in it. In order to read information into the core storage unit 612, it is necessary to develop a source of bit frequency clock pulses to be supplied to the core storage unit 612. For this purpose an AND gate 615 which has one enabling potential supplied thereto from the OR gate 613, has its output connected to a ringing oscillator circuit 628. Ringing oscillator 628 has a tuned circuit tuned to the bit frequency rate of the master clock oscillator 572, and upon receiving an enabling potential from the AND gate 615 will develop a bit frequency oscillatory signal. This oscillatory signal is applied to a Schmitt trigger wave shaping circuit 629 which functions to develop the bit rate clock pulses, and applies them through AND gate 624 and delay line device 631 to the core storage unit to be used in clocking in data supplied through the AND gate 611. Prior to the AND gates 615 and 609 opening and allowing data to be applied to AND gate 611, it is necessary for AND gates 615 and 609 to receive an enabling potential from the controller of the recorder which is applied through the input terminal 632.

When initially placing the recorder equipment into operation, or for that matter prior to any reading or writing operation with the recorder, it is first necessary to properly locate a desired block of data in the case of reading, or in the case of writing to place the desired position where the data block is to be written, under either the readout flying spot scanner 406, or the electron beam writing apparatus 405, whichever the case may be. In order to do this it is first necessary to read an address block located in the address track on the thermoplastic film tape 401 to determine where the tape is with respect to the readout means. As was explained in connection with the vertical drive circuits shown in FIGURE 10 of the drawings, the vertical drive motor is provided with a reference signal from flip flop 462 in the horizontal drive circuits shown in FIGURE 9 which causes the vertical drive circuit shown in FIGURE 10 to drive the tape carriage 429 in a manner to position the address track on thermoplastic film tape 401 under the readout flying spot scanner tube 406. Concurrently the horizontal drive circuit develops a set to mid screen signal that is supplied through terminal 463 to the control grid of a clamping triode tube 640 to cause it to clamp the output potential of vertical drive circuit 579 to a predetermined potential to cause the readout light spot on flying spot scanner tube 406 to come to its mid screen position for reading out the address. Upon completion of these operations, the vertical drive circuits will produce a vertical drive finished signal. This vertical drive finished signal is then supplied to the horizontal drive circuit shown in FIGURE 9 which operates to develop a start-read signal that is applied to terminal 641 shown in the lower left-hand corner of the reading system shown in FIGURE 12 of the drawings.

The start-read signal supplied to input terminal 641 is applied to an AND gate 642 which has a second enabling potential applied thereto from the line gating pulse multivibrator 575 supplied over the conductor 643. The AND gate 642 has its output connected to a one shot multivibrator 644 of conventional construction which will produce a long time duration enabling potential at its output upon being triggered by the AND gate 642. The enabling potential from one shot multivibrator 644 is then applied to one input terminal of the AND gate 617 whose second input terminal is connected to the output of OR gate 613, and to a second AND gate 645 whose remaining input terminal is connected to the output of the Schmitt trigger circuit 608 in the 1's data channel. Accordingly, the enabling potential from one shot multivibrator 644 will enable AND gate 617 and 645 to open, and to supply an enabling potential therethrough in the case of the AND gate 617, and data pulses representing the 1's data in the case of the AND gate 645. The enabling potential provided at the output of AND gate 617 is supplied to a differentiating circuit wherein it is formed into a short pulse which is supplied to an AND gate 647, and to the set input terminal of a flip flop amplifier 648. Since the AND gate 617 had one of its input terminals connected to the output of OR gate 613, it can be appreciated that the set triggering potential applied to flip flop 648 constitutes the block edge recognition signal of the address data block such as would be produced as the light beam of the flying spot scanner 406 traces across the first trace line indicated at 594 in FIGURE 12*a*. Hence, the timing at which the flip flop 648 is turned on can be used to identify the position of the edge of the data block with respect to the flying spot scanner readout tube 406. For this reason, flip flop 648 comprises a part of an address block aligned signal developing circuit that further includes an AND gate 649 having its output connected to a terminal 651 which is connected to a similarly marked terminal 651 on the horizontal fine drive circuit shown in FIGURE 9 of the drawings. The AND gate 649 also has an enabling potential supplied thereto from a conductor 652 which is connected to the conductor 643 and hence has the line frequency gating pulses supplied thereto. Conductor 643 is also connected to the input of a delay device 653 whose output is connected to a one shot multivibrator 654 of conventional construction. The one shot multivibrator 654 has its output connected to the AND gate 647, and to the reset input terminal of the flip flop amplifier 648. It should also be noted that the conductor 652 which connects line frequency gating pulses from the one shot multivibrator 575 is also connected to the reset input terminal of the flip flop amplifier 656 having its set input terminal connected to the output of AND gate 657. The AND gate 657 has one of its input terminals connected to the output of delay device 658 which also has its input connected to conductor 652. The AND gate 657 has its remaining input terminal connected to a terminal marked 478 which is connected to a similarly marked terminal on the horizontal drive circuit shown in FIGURE 9 of the drawings.

The circuitry just described comprises the logical circuitry for causing the horizontal fine drive in the horizontal drive circuitry to center the thermoplastic film tape 401 precisely under the readout flying spot scanner 406. To understand how this logical circuitry operates with the horizontal fine drive circuit of FIGURE 19 to accomplish this, the two circuits should be viewed together wherein it can be seen that the enabling potential provided at the output of the AND gate 649 in the reading system of FIGURE 12 is connected through terminal point 651 to a delay device 661 in the horizontal fine drive circuitry. In addition, line gating impulses are supplied from the conductor 652 through terminal 662 to the reset input terminal of flip flop amplifier 663, having its set input terminal connected to the output of the delay device 661. The inverse output terminal of flip flop 663 is connected through an amplifier and filter circuit 664 across the field winding 665 of a reversing relay whose movable contacts 666 are connected in the field excitation circuit of the fine drive motor 424 of the horizontal drive circuit. As a result of this connection, it can be appreciated that when a potential is supplied to the reversing relay 665 the direction of rotation of the fine drive motor 424 will be reversed.

In order to determine how the reversing potential for application to reversing relay 665 is developed, reference is again made to the reading system shown in FIGURE 22 of the drawings. It can be appreciated that the block edge recognized signal supplied to AND gate 617 from OR gate 613 and formed into a short pulse by differentiating circuit 500, will enable the AND gate 647, after the start-read signal has been supplied through input terminal 641. After a short delay, a line gating signal is supplied by the one shot multivibrator 654, to AND gate 647. It can be appreciated that when these two enabling pulses supplied to AND gate 647 are coincident, that the block of address data being read out will be properly aligned under the readout flying spot scanner 406. Upon this occasion the AND gate 647 will open and apply a readout-centered signal through the output terminal 475 to a similarly marked terminal 475 on the horizontal drive circuits, FIGURE 9. Because such coincidence upon the start of reading will not be usual, circuitry has to be provided to cause the horizotnal drive motor 424 to position the tape in one direction or the other to bring it into position to cause coincidence of these two enabling potentials. For this purpose, the flip flop 648 and AND gate 649 are provided. From an examination of FIGURE 12*a*, it can be seen that at the beginning of each line scan, a line gating pulse will be produced which is passed through AND gate 617, and then applied to the SET terminal of flip flop 648. Accordingly, at the beginning of each line of scan, after some delay through a delay device 653, one shot multivibrator 654 will be triggered and the pulse thus generated in its output will be applied to flip flop 648 resetting it to its off condition so that no enabling potential will be present at one of the inputs of the AND gate 649. As the scanning beam of light moves along the line scan such as 594, it will cause a block edge recognized signal to be produced at the output of OR gate 613 that is applied through AND gate 617 to the SET terminal of flip flop 648. If there is a time gap between this occurrence and the occurrence of the line gating pulse after passing through the delay provided by delay device 653, then when the next line gating pulse samples the AND gate 649, there will be no enabling potential provided at the output of the AND gate 649. Accordingly, no enabling potential will be applied through the delay device 661 to flip flop 663 of FIGURE 19 and to the reversing relay 665 to pick up the reversing contacts on the fine drive motor 424 so that this motor will drive the tape in its forward direction to minimize the time gap between the block edge recognition signal from OR gate 613 and the delayed line gating pulse. Upon these two pulses being time coincident, then, of course, the AND gate 647 will be enabled and produce a readout device centered signal that is supplied through the terminal 475 to the horizontal drive circuits, as mentioned previously. In the case of the reverse situation where the data block edge recognized signal occurs prior to the beginning of the delayed line gating pulse, then it can be appreciated that the flip flop 648 will be triggered to its set or on condition upon the occurrence of the line gating pulse applied to AND gate 649. As a consequence, a gating pulse will be applied from AND gate 649 through the delay device 661 in the horizontal fine drive circuit, and then applied to the set input terminal of flip flop 663. Because of the delay provided by delay device 661, the flip flop 663 will have already been triggered to its reset condition by a line blanking pulse applied thereto from the line blanking input 662. Consequently, flip flop 663 will be triggered to its set condition, and will produce an enabling potential that is applied across the reversing relay 665 to reverse the energizing potential applied to horizontal fine drive motor 424. Since the run relay 473 has already been closed, the fine drive motor 424 will then cause the horizontal fine drive pinion 427 to drive the thermoplastic film tape 401 carriage 428 in the reverse direction to bring the block edge recognized signal from OR gate 613 and the delayed horizontal line gating pulses into time coincidence. Upon this occasion a reading system-centered signal will be produced by the AND gate 647, and applied through the terminal 475 to the horizontal drive circuits shown in FIGURE 9.

Upon the reading system-centered signal being applied to the terminal 475 in the horizontal drive circuits shown in FIGURE 9, this signal pulse will trigger flip flop 470 to its OFF or RESET condition so that an enabling potential appears at its inverse output terminal that is applied to the AND gate 476. AND gate 476 has already received an enabling potential on its other input terminal from the flip flop 469 which was triggered on when the vertical drive finished signal pulse was applied to the horizontal drive circuit. Accordingly, AND gate 476 will provide an enabling gating pulse to flip flop 477 which is triggered to its ON condition. Flip flop 477 in going to its ON condition will produce a negative going potential that is supplied through a terminal 478 connected to a similarly marked terminal point 478 on the reading system shown in FIGURE 12 of the drawings. Referring to FIGURE 12, the start-read signal pulse applied to terminal 478 is applied to one input of AND gate 657 so that upon the occurrence of the next line gating pulse after a slight delay by delay device 658, the AND gate 657 will provide a triggering pulse to the flip flop 656 to trigger it to its ON condition. Upon being triggered to its ON condition, flip flop 656 will provide an enabling potential to an AND gate 671, whose other input is connected to the output of a shift clock oscillator 672 connected to the output of the AND gate 617. Shift clock oscillator 672 comprises a ringing oscillator having its tank circuit tuned to the bit frequency rate so that upon being supplied with a block edge recognized signal from the OR gate 613, it will develop a bit clock oscillatory signal which is converted by a Schmitt trigger circuit, not shown, but comprising a part of bit clock oscillator 672, into bit clock pulses that are applied through AND gate 671. Another input to AND gate 671 is obtained from the output of one shot multivibrator 600 the input of which is connected to the output of OR gate 613. One shot multivibrator 600 is adjusted such that upon receiving a block edge recognition pulse from the output of OR gate 613 it produces in its output a negative pulse energizing potential which is exactly 13 clock pulse periods long. Thus AND gate 671 is caused to pass only 13 clock pulses from shift clock oscillator 672. The bit clock pulses supplied from AND gate 671, are then applied to an AND gate 673, having its remaining input terminal connected to the output of and gate 645 to which the 1's data signal is supplied from Schmitt trigger circuit 608 connected to the output of photomultiplier readout tubes 409 and 411. The bit rate clock pulses will then serve to clock through the data signal from AND gate 645 and to supply it through the AND gate 673 to a terminal 674 connected to a similarly marked terminal 674 on the address register comparison circuits shown in FIGURE 11 of the drawings. Additionally, the bit rate clock pulses applied from AND gate 671 are also applied to a second output terminal 675, to a similarly marked terminal 675 on the address register comparison circuits shown on FIGURE 11 for the purpose of shifting through the data supplied thereto from AND gate 673. It can be appreciated from the foregoing description that the above described circuitry therefore, serves to recognize the edge of the address data block of a particular location of the tape with respect to the readout flying spot scanner 406, and to cause the block edge to come into registry with a preferred readout position by comparing the block edge recognized signal to a delayed line gating pulse occurring shortly after the commencement of each scanning line of the scanning readout beam produced by the flying spot scanner readout tube 406. Upon causing these two signals to come into registry, and therefore, assure that the address data block is properly aligned under the flying spot scanner readout tube 406, an address data block centered signal is produced which is supplied through the horizontal drive circuits to cause the reading system to then read out the address data contained in the address data block, and to supply it to the address comparison circuits shown in FIGURE 11 of the drawings.

*Address comparison circuit*

The address comparison circuit shown in FIGURE 11 of the drawings comprises a first address shift register formed by a series of flip-flop amplifiers 681 having their inverse output terminals connected to the trigger input terminal of the next succeeding flip flop 681 through a delay device 682. The shift register thus comprised has horizontal address data supplied to the first flip flop 681 in the register through an OR gate 683 from an input terminal 684 connected to the output of a computer or other intelligence device supplying commands to the recorder. A series of bit rate clock pulses are also supplied to the shift register 681 through an input terminal 685 connected through an OR gate 686 to the reset input terminals of all of the flip-flops 681 in the input address register. By this arrangement the horizontal address of the desired location supplied through the input terminal 684 from the computer will be shifted through all of the flip-flop amplifiers 681 by the bit rate clock pulses supplied through the OR gate 686 to all of the flip-flops 681. In this manner the horizontal address of the desired block of data to be read out, or the address of the position in which a particular block of data is to be written on the thermoplastic film tape 401, can be read into the input address register. In order to preserve the address thus supplied to the input address register during subsequent reading out operations, a feedback connection 687 is provided from the inverse output terminal of the last flip-flop 681 through a delay device 688 having its output connected through an AND gate 689 to OR gate 683. AND gate 689 has its remaining input terminal connected to the output of the computer or other intelligence device giving directions to the tape recorder through a terminal 691 to which an address finished enabling potential is applied when the computer or other intelligence device has finished supplying the horizontal address of the desired data block space to the input address register. As a consequence of this arrangement, when the address is read out in the manner to be described hereinafter from the input address register, it is recirculated through the address register and preserved.

The horizontal address derived by the reading system of FIGURE 12 showing the location of the reading system with respect to the horizontal position of the thermoplastic film tape 401, is supplied through the input terminal 674 to a serial subtractor 692. This address is clocked into the serial subtractor 692 by the bit clock pulses supplied through the input terminal 675. These bit clock pulses are also supplied through the input terminal 675 and through a conductor 693, back to OR gate 686 for clocking out the address stored in the input address shift register 681 so that the serial subtractor 692 has both addresses supplied thereto concurrently. The serial subtractor 692 is of conventional construction such as described in the above identified textbook by Richards on pages 113 to 133 thereof, entitled "Arithmetic Operations in Digital Computers," R. K. Richards, author, published by D. Van Nostrand Company, Inc., Princeton, N.J. 1955. The serial subtractor 692 serves to subtract the address data being supplied to the serial subtractor from the reading system of FIGURE 12 through input terminal 674 from the address contained in the address shift register comprised by flip-flops 681 and being clocked into the serial subtractor by bit clock pulses supplied through the input terminal 675, conductor 693, and OR gate 686 to the flip-flops 681.

As a result of the subtraction operation, the serial subtractor will produce an output signal from its output which represents the difference between the address stored in the address shift register 681, and the address being read out by the reading system of FIGURE 22. This difference data is then supplied to a difference shift register comprised by a series of flip-flop amplifiers 695 through a delay device 696 connected to the trigger input terminal of each of the flip-flops 695. The normal output terminal of each of the flip-flops 695 is connected through the delay device 696 to the trigger input of the next succeeding flip-flop 695 to thereby form the difference shift register with the left-most flip-flop 695L containing the least significant digit in the difference data supplied from the serial subtractor 692, and the right-most flip-flop 695M contains the most significant digit in this difference data. The difference data is caused to be shifted through the shift register 695 by bit rate clock pulses supplied over the conductor 697 and conductor 693 from the input terminal 675 to which the bit rate pulses are supplied from the reading system of FIGURE 12. Each of the flip-flops 695 in the difference storage register has its normal output terminal connected to the set input terminal of a comparator flip-flop 698 associated therewith, and the inverse output terminal thereof connected to the reset input terminal of the associated comparator flip-flop 698. As a result of this construction, there is a string of comparator flip-flops 698 which make up a comparator counter and all of which are set to the same value that head into its associated flip-flop 695 in the difference shift register. Each of the comparator flip-flops 698 has its trigger input terminal connected to the output of an associated OR gate 699, and has its inverse output terminal connected to one of the inputs of an AND gate 701. Each of the AND gates 701 have their output terminals connected through the respective associated OR gate 699 to the trigger input terminal of the next succeeding comparative flip-flop 698 in the string. Additionally, the inverse output terminal across all of the comparator flip-flops 698, are connected across conductors 702 to the input of an AND gate 703, the purpose of which will be appreciated more fully hereinafter. The six most significant comparative flip-flops 698 also have their normal output terminals connected through conductors 703 to an AND gate 704, the purpose of which likewise will be appreciated more fully hereinafter.

Each of the OR gates 699 has two inputs, one of which is connected to a line conductor 705, and one of which is connected to the output of AND gates 701. The conductors 705 and 706 are connected together; however, the conductor 706 has an inverter 707 inserted therein which is of conventional construction and functions to provide an enabling potential on the conductor 706 in the event that no energizing potential is supplied to the conductors 706 from a conductor 708 connected to the output of an AND gate 709. As is conventional in inverter circuits, if a potential is provided through the conductor 708, then the potential of inverter 707 is removed and no potential exists on the conductor 706. However, most of the time no energizing potential appears on conductor 708 so that an enabling potential is provided to the AND gates 701 from conductor 706. As a consequence the AND gates 701 are capable of shifting through count pulses supplied to the least most significant flip-flop 698L in the comparator shift register from its OR gate 699. The count pulses are supplied to the OR gate 699 from a count pulse input terminal 504 that is connected to a similarly marked terminal 504 on the horizontal drive circuit. The count pulses supplied to the terminal 504 on the horizontal drive circuit are derived from the magnetic pickup counter 418 actuated by the magnetic tooth sprocket wheel 417 which is keyed to the same shaft as the horizontal drive sprocket wheel 404 that drives the thermoplastic film tape 401. Accordingly, as the thermoplastic film tape 401 is driven by the coarse horizontal drive motor or by the fine horizontal drive step motors to move tape 401 so as to reduce the difference between the desired address and the existing address previously read out, the counter pulses will be supplied through terminal 504 to the OR gate 699 to the comparator counter comprised by the flip-flops 698. These count pulses will then serve to reduce the difference data contained in the comparator flip-flops 698 to zero. When this condition is reached, then the desired data block position should have been obtained; and, when all of the flip-flops 698 are in their zero state, an enabling potential will appear at the inverse output terminals of all of the flip-flops 698 which are supplied through the conductors 702 to AND gate 703. Upon all the flip-flops 698 being returned to zero AND gate 703 will open and provide an enabling pulse through the output terminal 521 to similarly marked input terminal 521 in the horizontal drive circuit, as was described in connection with those circuits. Additionally, when the six most significant flip-flops 698 have all been set to one, in cycling through this condition an enabling potential will appear at the normal output terminal of all of these six most significant flip-flops. These enabling potentials are applied through the conductors 703 to the AND gate 704 and serve to provide a slowdown output signal that is applied to the horizontal drive circuit shown in FIGURE 9 to cause the coarse horizontal drive motor 415 to be released and to cause the step motors 420 or 421 to take over driving the thermoplastic film tape towards the desired address.

In order that the address comparator circuit in FIGURE 11 provide some indication to the horizontal drive circuit shown in FIGURE 9, of what direction to run, a means is provided for sensing the direction in which the tape should be moved to minimize the difference in the desired address and the existing address. This means includes a flip-flop amplifier 711. Flip-flop 711 has its set input terminal connected to the output of the serial subtractor 692 which provides an indication of any borrow value occuring in the subtraction operation performed by the subtractor. Since the desired address is subtracted from the address data supplied to the serial subtractor by the reading system, the presence of a borrow at the end of the subtraction would indicate that the desired address is further along the tape than the position then located under the readout flying spot scanner 406. The presence of a borrow signal triggers flip-flop 711 to its ON condition in which event there is no potential at its inverse output terminal. The inverse output terminal of flip-flop 711 is connected to one of the inputs of the AND gate 709. The remaining input of the AND gate 709 is connected to a conductor 712 which is connected to the input terminal 479 to which the readout finished signal pulse is supplied by flip-flop 656 in the reading system of FIGURE 10 when the readout of the address data track has been completed. Under the above conditions the AND gate 709 will not provide an enabling potential over the conductor 708 so that the coarse drive motor in the horizontal drive circuits of FIGURE 9 will operate directly to drive the tape in a direction to reduce the difference between the desired address and the address read out. When running in this conition, the inverter circuit 707 provides an enabling potential to the AND gates 701 of the comparator shift register formed by the flip-flops 698 so that counter pulses applied thereto through terminal 504, while the tape is being moved, can carry through the register.

In the event the reverse condition prevails where the desired address is not as far along the tape as the location under the readout flying spot scanner 406, then the flip-flop 711 will be in its reset condition since no borrow will have occurred in the subtraction of the two most significant digits of the desired and actual address. The readout finished signal which is applied to terminal 479 is passed through a slight delay 713 and through OR gate 714 to the reset terminal thereby resetting flip-flop 711 to its zero condition shortly after the occurrence of the readout finished signal in preparation for the next readout. However, any output from flip-flop 711 is prevented fron entering the serial subtractor by AND gate 716 which is deenergized by the delayed readout finished signal causing inverter 715 to remove the enabling potential from AND gate 716. During the subtraction, however, AND gate 716 is kept open by inverter 715 for the purpose of feeding back any borrow signal to the serial subtractor 692 during the readout of the data. Upon the occurrence of the readout complete signal supplied through terminal 479, flip-flop 711 will be in its off condition for the above-mentioned case and therefore will apply an enabling potential to AND gate 709. In this condition, a trigger pulse will be supplied through the AND gate 709 and across conductor 708 to the inverter 707 to temporarily disenable the AND gates 701. This temporarily disenables all of the AND gates 701 so that the trigger pulse supplied over conductor 705 to the OR gates 699 can set the comparator shift register made up of flip-flops 698 to the complement of the number read into it from the difference shift registed 695. The signal pulse on conductor 705 is also applied through a delay device 710 to the OR gate 699 of the least significant flip-flop 698L, and operates as an end around borrow to leave the comparator shift register ready to have the count set therein minimized by the counter pulses applied through terminal 504.

The signal pulse on conductor 705 is also applied through a delay device 717, to the set input terminal of a flip-flop amplifier 718. The flip-flop 718 was reset to its OFF condition by the readout complete signal supplied from the input terminal 479 across a conductor 719 to the reset input terminal of flip-flop 718. Accordingly, the signal pulse applied from conductor 705 through delay device 717 will serve to trigger the flip-flop 718 to its on condition. Upon being triggered to its on condition, the flip-flop 718 will produce an enabling potential at its inverse output terminal which is supplied through the terminal 481 to a similarly marked terminal in the horizontal drive circuits of FIGURE 9. This enabling potential will then actuate the reversing relays to both the horizontal coarse drive motor 415 and the horizontal fine drive step motors 420 to cause the horizontal drive circuit to drive the thermoplastic film 401 in the reverse direction in order to minimize the difference between the desired address and the address read out by the reading system of FIGURE 12. As the tape is moved in the proper direction to reduce this difference, the counter pulses being fed to the counter flip-flops 698 will gradually set all of these flip-flops to their zero condition. Upon the six most significant flip-flops 698 reaching their one condition, they will produce a slowdown pulse at the output of the AND gate 704 which will serve to shift the horizontal drive over to the step motor 420. Subsequently, as all of the flip-flops are set to their zero condition, a stop pulse will be produced by the AND gate 703 which will serve to turn off the horizontal drive circuit shown in FIGURE 9, as was previously described. After reaching the desired address, the controller unit then actuates either the reading system shown in FIGURE 12, or the writing circuit described more fully in the above identified co-pending application of Hughes, Wolfe, and Glenn, to either read or write data in the selected space. This will result in turning off the flip-flops 462 and 469 so as to deactivate the horizontal drive circuit shown in FIGURE 19. Upon the flip-flop 462 being triggered to its off condition, an enabling potential will be produced at its normal output terminal which is coupled through the terminal 721 to a similarly marked terminal 721 in the controller circuits shown in FIGURE 23 of the drawings.

*Controller*

The controller unit for the tape recorder is shown in FIG. 13 of the drawing, and includes a flip-flop amplifier 722, which has a turn-on signal pulse supplied to its set input terminal from a terminal 723 connected to the computer or other intelligence directing device which tells the controller for the tape recorder to start a reading or writing operation, whichever the case may be. Flip-flop 722, upon being triggered to its ON condition, produces an enabling potential at its normal output terminal which is supplied to an AND gate 724. The AND gate 724 has a horizontal drive-complete enabling potential applied to its second input terminal from the terminal 721 connected to the horizontal drive circuit when the horizontal drive circuit has found a desired address. Accordingly, upon an enabling potential appearing at the terminal 721, AND gate 724 opens, and provides a trigger pulse to a flip-flop amplifier 725. Upon being triggered to its SET condition the flip-flop 725 produces an enabling potential at its normal output terminal which is supplied through the terminal 726 to a similarly marked terminal on the vertical drive circuits shown in FIG. 20 of the drawings. This potential will then activate the vertical drive circuit to cause it to move the tape carriage vertically with respect to either the readout means or the writing means dependent upon which is to be activated, so as to position a desired data block position under either the readout means 406 or the electron beam writing apparatus 405. Upon the completion of the vertical positioning of the tape carriage, a vertical position finished signal is developed by the vertical drive circuits, and is supplied through a terminal 468 to the reset input terminal of the flip-flop 725. The flip-flop 725 in being triggered to its reset condition produces an enabling potential at its inverse output terminal which is supplied to the set input terminal of a flip-flop 727. This enabling potential causes the flip-flop 727 to be triggered to its ON condition, and to produce an enabling potential at its normal output terminal. The enabling potential produced by flip-flop 727 is then provided in parallel to an AND gate 728 and to an AND gate 729.

In the event that the instructions contained in the address supplied to the address register of the vertical drive circuits were that the equipment was to read, then an enabling potential will appear at the terminal 535 connected to AND gate 728. The presence of enabling potentials at both input terminals of the AND gate 728 will produce a triggering pulse that is applied to the set input terminal of a flip-flop 731. Flip-flop 731 has its output connected to a one shot multivibrator 732, and to a terminal 632 connected to a similarly marked terminal 632 in the reading system of FIG. 12. The enabling potential supplied through the terminal 632 will enable the AND gates 609 and 615 in the readout circuits to open these AND gates and allow data to be supplied from the readout photomultipliers 409 and 411 through the readout circuits to the core storage 612 of the tape recorder. Additionally, a one shot multivibrator 732 is triggered by the enabling potential at the output of flip-flop 731 to produce a prolonged energizing potential that is applied to the terminal 578. Terminal 578 is connected to a similarly marked terminal in the reading system shown in FIG. 12, and serves to turn on the vertical sweep generator, and hence, commence the reading operation. Upon completion of the reading operation, the reading system shown in FIG. 12 will produce a finished-reading signal pulse which is supplied to the terminal marked 733. This finished reading pulse is supplied through the terminal 733 to the reset input terminal of flip-flop 731, and through the OR gate 734 to the reset input terminals of the flip-flops 727 and 722. This finished reading signal pulse then serves to turn off the flip-flops 731, 727 and 722, thereby turning off the controller until it is again cycled through a new operation by a command signal from the computer or other intelligence directing device applied through the input terminal 723.

In the event that the directions contained in the address supplied to the vertical address register of the vertical drive circuits shown in FIG. 12 were for the tape recorder to write, then an enabling potential will be present on the input terminal 536 of AND gate 729. In this eventuality AND gate 729 will open rather than the reading AND gate 728 upon flip-flop 727 being triggered to its ON condition. Opening of the writing AND gate 729 will provide a trigger pulse to the set input terminal of a flip-flop 735, and through a delay line 736 to the set input terminal of a second flip-flop 737. Flip-flop 735 in being triggered to its ON condition by the enabling potential from AND gate 729, produces a gating pulse at its inverse output terminal which is supplied through an OR gate 738 to trigger a one shot multivibrator 739. The one shot multivibrator 739 then produces a prolonged energizing potential which is supplied through terminal 624 to a similarly marked terminal on the radio frequency heating actuating circuits of the writing circuits described in the above identified co-pending Hughes, Wolfe and Glenn application. This potential will then activate the RF heating electrode to cause it to heat the area upon which data is to be written for the purpose of erasing any previously recorded data, and also to prepare the thermoplastic film surface to receive the pattern of electrons to be written thereon. Subsequently, the delay device 736 will provide an enabling potential to the set input terminal of the flip-flop 737. Flip-flop 737 in being triggered to its ON condition, will produce an output trigger pulse which is supplied to a one shot multivibrator 742. One shot multivibrator 742 has its output connected through a terminal 743 to a similarly marked terminal on the writing circuits shown in the broad diagram form only in FIG. 12 of the drawing. Upon completion of the writing operation by electron beam writing apparatus 405, a writing-completed signal pulse will be supplied back to the controller through the terminal 744 where it is applied to the reset input terminals of the flip-flop 737 to flip-flop 735, and through OR gate 734 to the reset input terminals of flip-flops 722 and 727 thereby turning off the controller shown in FIG. 13 until the next cycle of operation to be performed by the tape recorder. In being triggered to its OFF condition, flip-flop 737 will produce an enabling potential at its inverse output terminal which is supplied back through the OR gate 738 to one shot multivibrator 739. This results in triggering the one shot multivibrator 739 on to produce a radio frequency heating energizing potential to cure the electron pattern that has just been written by the writing circuits.

From the above set forth description, it can be appreciated that the invention provides a number of new and improved tape recorders employing a thermoplastic film tape recording medium on which data can be recorded in many forms. It is possible to record data tracks longitudinally along the length of the tape, or in blocks of data whose location is marked with an address track. After recording, the data may be read back out by electro-optical devices efficiently and accurately. The data can be recorded on the tape in either analog or digital form, and hence, recorders constructed in accordance with the invention can be readily adapted to a wide number of users. Recorders constructed in this manner are capable of recording a large amount of data in comparatively little space, and hence, have a large recording capacity in contrast to their size. They are capable of recording at rates extending over a wide frequency range, with particular ones of the recorder embodiments disclosed exhibiting either excellent high frequency response, or low frequency response, or a response which extends over a broad range of frequencies. The quality of data recorded by the recorders, and the reproduction of the recorded data is excellent, and the access time required to read out any particular portion of the data recorded is relatively fast in comparison to the volume of data stored.

Having described several embodiments of a thermoplastic film tape recorder constructed in accordance with the invention, it is believed obvious that many modifications and variations of the present invention are possible in the light of the above teachings. It is therefore to be understood that changes may be made in the particular embodiments of the invention described which are within the full intended scope of the invention as defined by the appended claims.

What we claim as new and desire to secure by Letters Patent of the United States is:

1. A data storage device including in combination a tape of solid radiant energy impressionable recording medium, a radiant energy writing apparatus for impressing radiant energy on said tape to form radiant energy modifying marks therein in desired intelligence conveying data patterns extending along the longitudinal axis of the tape, tape drive means for moving said tape in the direction of its longitudinal axis past said radiant energy writing apparatus and for accurately positioning any desired point along the tape with respect to said radiant energy writing apparatus, and servo control means for accurately controlling the operation of said tape drive means, said servo control means including address comparison means having an address register, means for deriving a present tape position signal representative of the instantaneous position of any data pattern location on the tape, comparator circuit means for comparing the present tape position signal to the desired address read into the address register and for deriving an output error signal representative of the magnitude and direction of any difference, and means for applying said output error signal to said tape drive means for driving the present tape position signal into coincidence with the desired address.

2. The combination set forth in claim 1 further characterized by heating means for conditioning the impressionable tape to permanently set the radiant energy modifying marks on the tape.

3. The combination set forth in claim 1 further characterized by radiant energy readout means for inspecting portions of the impressionable tape having radiant energy modifying marks formed thereon in intelligence conveying patterns and deriving an output electrical signal indicative of such intelligence.

4. The combination set forth in claim 1 further characterized by heating means for conditioning the impressionable tape to permanently set the patterns thereby to form radiant energy modifying marks on the tape, and radiant energy readout means for inspecting portions of the impressionable tape having radiant energy modifying marks formed thereon in intelligence conveying patterns and deriving an output electrical signal indicative of such intelligence.

5. The combination set forth in claim 1 further characterized by heating means for conditioning the impressionable tape to permanently set the patterns thereby to form semi-permanent radiant energy modifying marks on the tape, radiant energy readout means for inspecting portions of the impressionable tape having radiant energy modifying marks formed therein in intelligence conveying patterns and deriving an output electrical signal indicative of such intelligence, and controller means for selectively controlling the operation of said servo control means, the radiant energy writing apparatus, the radiant energy readout means, and the heating means.

6. A data storage device including in combination a tape of solid radiant energy impressionable recording medium having radiant energy modifying marks formed therein in intelligence conveying data patterns, a radiant energy readout means for inspecting the intelligence conveying patterns on the impressionable tape and deriving an output electrical signal indicative of such intelligence, tape drive means for moving said tape in the direction of its longitudinal axis past said radiant energy readout means and for positioning any desired point along the tape with respect to said radiant energy readout means, and servo control means for accurately controlling the operation of said tape drive means, said servo control including address comparison means having an address register, means for deriving a present tape position signal representative of the instantaneous position of any data pattern location on the tape, comparator circuit means for comparing the present tape position signal to the desired address read into the address register and for deriving an output error signal representative of the magnitude and direction of any difference, and means for applying said output error signal to said tape drive means for driving the present tape position signal into coincidence with the desired address.

7. A data storage device including in combination a tape of solid impressionable thermoplastic film recording medium, an electron beam writing apparatus for impressing electrons on said tape in desired intelligence conveying data patterns which patterns extend along the longitudinal axis of the tape, heating means for conditioning the impressionable tape to accept the electron patterns and curing the tape after impression of the electron patterns thereon to permanently set the patterns thereby to form light-modifying marks on the tape, electro-optical readout means for inspecting portions of the impressionable tape having light-modifying marks formed thereon in intelligence conveying patterns and deriving an output electrical signal indicative of the such intelligence, tape drive means for moving said tape at least in the direction of its longitudinal axis for positioning any desired point along the tape with respect to said electron beam writing apparatus, said heating means, and said electro-optical readout means, and servo control means for accurately controlling the operation of said tape drive means, said servo control means including address comparison means having an address register, means for deriving a present tape position signal representative of the instantaneous position of any data pattern location on the tape, comparator circuit means for comparing the present tape position signal to the desired address read into the address register and for deriving an output error signal representative of the magnitude and direction of any difference, and means for applying said output error signal to said tape drive means for driving the present tape position signal into coincidence with the desired address.

8. The combination set forth in claim 7 further characterized by controller means for selectively controlling the operation of said servo-control means, electron beam writing apparatus, electro-optical readout means, and the heating means.

9. The combination set forth in claim 7 wherein said electro-optical readout means comprises a light source, an objective lens assembly for imaging light from said source on light modifying marks formed on said impressionable tape, a field lens assembly for projecting light emanating from said light modifying marks, an apertured plate positioned in the path of light projected by said field lens assembly and having a pair of spaced apart apertures therein for selecting out the first order light rays imaged by said field lens assembly, and a pair of photoelectric devices each positioned to having the first order light rays passing through a respective one of the apertures impinge thereon.

10. In a random access tape data storage device the combination of readout means for inspecting a tape of solid impressionable recording medium having an address track formed thereon by radiant energy modifying marks in intelligence conveying data patterns, tape drive means for moving the tape in either direction along its longitudinal axis to accurately position any desired point along the longitudinal axis of the tape with respect to the readout means, and servo control means for accurately controlling the operation of said tape drive means, said servo control means including address comparison means having an address register, means for deriving a present tape position signal from the address track which is representative of the instantaneous position of any data pattern location on the tape, comparator circuit means for comparing the present tape position signal to the desired address read into the address register and for deriving an output error signal representative of the magnitude and direction of any difference, and means for applying said output error signal to said tape drive means for driving the present tape position signal into coincidence with the desired address..

11. A random access tape data storage device including in combination a tape of solid impressionable recording medium having an address track formed thereon by a series of intelligence conveying radiant energy modifying marks, a radiant energy writing apparatus for im--pressing radiant energy on said tape in desired intelligence conveying data patterns, tape drive means for moving said tape at least in either of two directions along its longitudinal axis and for positioning any desired point along the tape with respect to said radiant energy writing apparatus, and servo control means for accurately controlling the operation of said tape drive means, said servo control means including address comparison means having an address register, means for deriving a present tape position signal from the address track which is representative of the instantaneous position of any data pattern location on the tape, comparator circuit means for comparing the present tape position signal to the desired address read into the address register and for deriving an output error signal representative of the magnitude and direction of any difference, and means for applying said output error signal to said tape drive means for driving the present tape position signal into coincidence with the desired address.

12. The combination set forth in claim 11 further characterized by heating means for heating the tape after impression of the radiant energy patterns thereon to permanently set the patterns.

13. The combination set forth in claim 11 further characterized by readout means for inspecting portions of the impressionable tape having radiant energy modifying marks formed thereon in intelligence conveying data patterns and deriving an output electrical signal indicative of such intelligence.

14. The combination set forth in claim 11 further characterized by heating means for conditioning the impressionable tape to permanently set the patterns thereby to form semi-permanent radiant energy modifying marks on the tape, readout means for inspecting portions of the impressionable tape having radiant energy modifying marks formed thereon in intelligence conveying data patterns and deriving an output electrical signal indicative of such intelligence, and controller means for selectively controlling the operation of said servo control means, the electron beam writing apparatus, the heating means, and the readout means.

15. A random access data storage device including in combination a tape of solid impressionable thermoplastic film recording medium having an address track formed thereon by a characteristic series of intelligence conveying radiant energy modifying marks that identify a characteristic block of data to be stored, an electron beam writing apparatus for impressing electrons on said tape in desired intelligence conveying patterns in an identified address block, readout means for inspecting the address of any desired block of data formed on the impressionable tape and deriving an output electrical signal indicative of the intelligence contained in the address, tape drive means for moving said tape in either direction along its longitudinal axis for accurately positioning any desired point along the tape with respect to said electron beam writing apparatus and said readout means, servo control means including an address register, comparator circuit means for comparing the address derived by the readout means of any given position along the tape to the address of a desired block of data read into the address register and deriving an output electric error signal representative of the magnitude and direction of any difference, and means for applying said error signal to said tape drive means to drive the tape to the desired position.

16. The combination set forth in claim 15 wherein the readout means also serves to read out the intelligence stored in a selected data block and to derive an electric output signal indicative of such intelligence.

17. The combination set forth in claim 15 wherein the readout means also serves to read out the intelligence stored in a selected data block and to derive an electric output signal indicative of such intelligence, and further characterized by heating means for heating the thermoplastic film to form permanent radiant energy modifying marks therein, and controller means for selectively controlling the operation of said servo control means, the radiant energy writing apparatus, the readout means and the heating means.

References Cited

UNITED STATES PATENTS

| | | | |
|---|---|---|---|
| 1,891,780 | 12/1932 | Rutherford | 340—173 |
| 2,391,451 | 12/1945 | Fischer | 340—173 |
| 2,853,357 | 9/1958 | Barber | 340—173 |
| 2,985,866 | 5/1961 | Norton | 340—173 |

BERNARD KONICK, *Primary Examiner.*

IRVING L. SRAGOW, T. W. FEARS, *Assistant Examiners.*